US012245152B2

(12) United States Patent
Ajami et al.

(10) Patent No.: US 12,245,152 B2
(45) Date of Patent: Mar. 4, 2025

(54) TRAFFIC MANAGEMENT IN RESTRICTED TARGET WAKE TIME (TWT) SERVICE PERIODS

(71) Applicant: QUALCOMM Incorporated, San Diego, CA (US)

(72) Inventors: Abdel Karim Ajami, San Diego, CA (US); Sai Yiu Duncan Ho, San Diego, CA (US); George Cherian, San Diego, CA (US); Alfred Asterjadhi, San Diego, CA (US); Abhishek Pramod Patil, San Diego, CA (US); Yanjun Sun, San Diego, CA (US); Gaurang Naik, Richmond, VA (US)

(73) Assignee: QUALCOMM Incorporated, San Diego, CA (US)

( * ) Notice: Subject to any disclaimer, the term of this patent is extended or adjusted under 35 U.S.C. 154(b) by 701 days.

(21) Appl. No.: 17/402,391

(22) Filed: Aug. 13, 2021

(65) Prior Publication Data
US 2023/0049192 A1    Feb. 16, 2023

(51) Int. Cl.
*H04W 52/02* (2009.01)
*H04W 28/02* (2009.01)
(Continued)

(52) U.S. Cl.
CPC ..... *H04W 52/0235* (2013.01); *H04W 74/0808* (2013.01); *H04W 28/0278* (2013.01); *H04W 74/002* (2013.01)

(58) Field of Classification Search
None
See application file for complete search history.

(56) References Cited

U.S. PATENT DOCUMENTS

| 10,952,245 B1* | 3/2021 | Smith | H04W 72/12 |
| 2018/0027453 A1* | 1/2018 | Viger | H04W 74/0816 370/336 |

(Continued)

FOREIGN PATENT DOCUMENTS

WO    WO-2022084341 A1    4/2022

OTHER PUBLICATIONS 802 11 Working Group of the LAN/MAN Standards Committee of the IEEE Computer Society: "Part 11: Wireless LAN Medium Access Control (MAC) and Physical Layer (PHY) Specifications", IEEE Draft, Draft P802.11REVME_D0.2, IEEE-SA, Piscataway, NJ, USA, No. D0.2, Aug. 5, 2021, pp. 1-5283, XP068184017, section 9.2.5.2, pp. 865-866, section 9.3.1.22.1, p. 897.

(Continued)

*Primary Examiner* — Jutai Kao
(74) *Attorney, Agent, or Firm* — Holland & Hart / QUALCOMM Incorporated

(57) ABSTRACT

This disclosure provides systems, methods and apparatus, including computer programs encoded on computer storage media, for managing data traffic in restricted target wake time (TWT) service periods (SPs). In some aspects, an access point (AP) may transmit a packet, at the beginning of a restricted TWT SP, that signals all non-member wireless stations (STAs) to defer access to the wireless medium for at least a threshold duration. Upon receiving the packet, any non-member STAs that are associated with the AP may set their network allocation vectors (NAVs) according to the duration indicated by a duration field of the received packet. In some implementations, low-latency STAs that are members of the TWT SP may not set their NAVs according to the duration field of the received packet. Instead, the low-latency STAs may access the wireless medium before the NAVs associated with the non-member STAs expire.

30 Claims, 21 Drawing Sheets

(51) Int. Cl.
*H04W 74/00* (2009.01)
*H04W 74/0808* (2024.01)

(56) References Cited

U.S. PATENT DOCUMENTS

| | | | |
|---|---|---|---|
| 2022/0078844 A1 | 3/2022 | Cherian et al. | |
| 2023/0047705 A1* | 2/2023 | Xin | H04W 74/0808 |
| 2023/0413176 A1* | 12/2023 | Nezou | H04W 74/0866 |
| 2024/0032089 A1* | 1/2024 | Chitrakar | H04W 72/12 |
| 2024/0196430 A1* | 6/2024 | Handte | H04W 74/04 |

OTHER PUBLICATIONS

Baron (Canon) S., "Low-Latency Triggered TWT", 11-20-1843-01-00BE-LOW-LATENCY-TRIGGERED-TWT, IEEE-SA Mentor, Piscataway, NJ, USA, vol. 802.11 EHT, 802.11be, No. Dec. 19, 2020, pp. 1-13, XP068175434, p. 7.
Hiertz, G.R., et al., "The Evolution of Wireless LANs and PANs—Analysis of IEEE 802.11 E for QoS Support in Wireless LANs," IEEE Personal Communications, IEEE Communications Society, US, vol. 10, No. 6, Dec. 1, 2003 (Dec. 1, 2003), XP011107079, pp. 40-50, ISSN: 1070-9916, DOI: 10.1109/MWC.2003.1265851, p. 40, col. 1, Line 1—p. 42, Line 34, Figures 1,2.
Hu (Facebook Inc) C., et al., "Prioritized EDCA Channel Access—Slot Management", 11-20-1046-14-00BE-PRIORITIZED-EDCA-CHANNEL-ACCESS-SLOT-MANAGEMENT, IEEE-SA Mentor, Piscataway, NJ, USA, vol. 802.11 EHT; 802.11be, No. 14, Feb. 26, 2021, pp. 1-22, XP068178883, p. 7.
International Search Report and Written Opinion—PCT/US2022/030344—ISA/EPO—Aug. 1, 2022 (2107116WO).

* cited by examiner

TRAFFIC MANAGEMENT IN RESTRICTED TARGET WAKE TIME (TWT) SERVICE PERIODS

TECHNICAL FIELD

This disclosure relates generally to wireless communication, and more specifically, to managing data traffic in restricted target wake time (TWT) service periods.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Thus, it is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method can be performed by a wireless communication device to manage data traffic in restricted target wake time (TWT) service periods (SPs). In some implementations, the method can include performing a channel sensing operation that indicates whether the wireless channel is busy or idle; and transmitting, at a first time, a first packet over a wireless channel associated with a restricted TWT SP responsive to the channel sensing operation indicating that the wireless channel is idle for a threshold duration relative to the start of the restricted TWT SP, where the first packet includes a duration field indicating a duration that the wireless channel is reserved, and where the channel sensing operation further indicates that the wireless channel is busy at a second time that follows the first time by less than the duration indicated by the duration field of the first packet Another innovative aspect of the subject matter described in this disclosure can be implemented in a wireless communication device. The wireless communication device can include a processing system configured to perform a channel sensing operation that indicates whether the wireless channel is busy or idle; and at least one interface configured to transmit, at a first time, a first packet over a wireless channel associated with a restricted TWT SP responsive to the channel sensing operation indicating that the wireless channel is idle for a threshold duration relative to the start of the restricted TWT SP, where the first packet includes a duration field indicates a duration that the wireless channel is reserved, and where the channel sensing operation further indicates that the wireless channel is busy at a second time that follows the first time by less than the duration indicated by the duration field of the first packet.

Another innovative aspect of the subject matter described in this disclosure can be implemented as a method of wireless communication. The method can be performed by a wireless communication device to manage data traffic in restricted TWT SPs. In some implementations, the method can include receiving, at a first time, a first packet over a wireless channel associated with a restricted TWT SP, where the first packet includes a duration field indicating a duration that the wireless channel is reserved; and transmitting, at a second time, a second packet over the wireless channel responsive to the first packet, where the second time follows the first time by less than the duration indicated by the duration field of the first packet.

Another innovative aspect of the subject matter described in this disclosure can be implemented in a wireless communication device. The wireless communication device can include a processing system and an interface configured to receive, at a first time, a first packet over a wireless channel associated with a restricted TWT SP, where the first packet includes a duration field indicating a duration that the wireless channel is reserved; and transmit, at a second time, a second packet over the wireless channel responsive to the first packet, where the second time follows the first time by less than the duration indicated by the duration field of the first packet.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
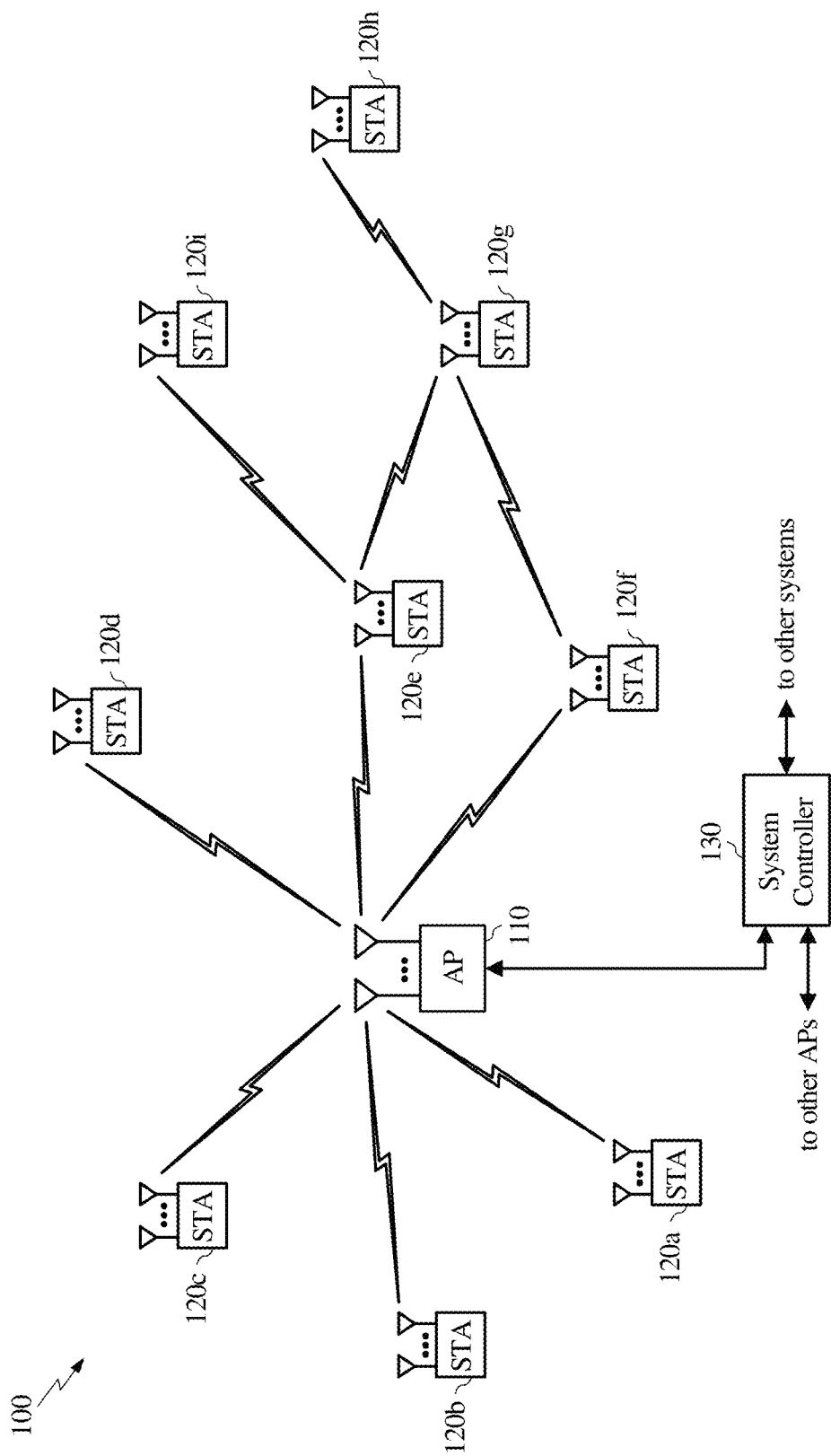
FIG. 1 shows a block diagram of an example wireless system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Many wireless networks use random channel access mechanisms to control access to a shared wireless medium. In these wireless networks, wireless communication devices (including access points (APs) and wireless stations (STAs)) contend with one another using carrier sense multiple access with collision avoidance (CSMA/CA) techniques to gain access to the wireless medium. In general, the wireless communication device that randomly selects the lowest back-off number (RBO) wins the medium access contention operation and may be granted access to the wireless medium for a period of time commonly referred to as a transmit opportunity (TXOP). Other wireless communication devices are generally not permitted to transmit during the TXOP of another wireless communication device to avoid collisions on the shared wireless medium.

Some random channel access mechanisms, such as enhanced distributed channel access (EDCA), afford high-priority traffic a greater likelihood of gaining medium access than low-priority traffic. EDCA classifies data into different access categories (ACs) such as, for example, voice (AC_VO), video (AC_VI), best effort (AC_BE), and background (AC_BK). Each AC is associated with a different priority level and may be assigned a different range of RBOs so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

The IEEE 802.11be amendment of the IEEE 802.11 standard describes a restricted target wake time (TWT) service period (SP) that can be used to provide more predictable latency, reduced worst case latency, or reduced jitter, with higher reliability for latency-sensitive traffic. As used herein, the term "non-legacy STA" may refer to any STA that supports restricted TWT operation, while the term "low-latency STA" may refer to any non-legacy STA that has latency-sensitive traffic to send or receive. In contrast, the term "legacy STA" may refer to any STA that does not support restricted TWT operation. The IEEE 802.11be amendment requires all non-legacy STAs that are TXOP holders outside of a restricted TWT SP to end their respective TXOPs before the start of any restricted TWT SP for which they are not a member. Although membership in a restricted TWT SP is reserved for low-latency STAs, the current rules regarding restricted TWT SPs do not prevent non-member STAs from acquiring a TXOP during a restricted TWT SP. As a result, some non-member STAs may gain access to a shared wireless medium, during a restricted TWT SP, even before members of the SP. Accordingly, new communication protocols or mechanisms are needed to further protect latency-sensitive traffic in restricted TWT SPs.

Implementations of the subject matter described in this disclosure may be used to manage data traffic in restricted TWT SPs. In some aspects, an AP may transmit a packet, at the beginning of a restricted TWT SP, that explicitly signals all non-member STAs to defer access to the wireless medium for at least a threshold duration. For example, the threshold duration may be indicated by a duration field in a medium access control (MAC) header of the packet. Upon receiving the packet, any non-member STAs that are associated with the AP may set their network allocation vectors (NAVs) according to the duration indicated by the duration field. In some implementations, the packet may be a trigger frame that solicits a trigger-based (TB) physical layer convergence protocol (PLCP) protocol data unit (PPDU) from one or more low-latency STAs. In some other implementations, the packet may be a clear-to-send (CTS)-to-self frame. In such implementations, any low-latency STAs that are members of the TWT SP may ignore the CTS-to-self frame. In other words, the low-latency STAs may not set their NAVs according to the duration indicated by the duration field of the CTS-to-self frame. Still further, in some implementations, the packet may be a multi-user (MU) request-to-send (RTS) frame identifying one or more low-latency STAs. In such implementations, each low-latency STA identified by the MU-RTS may transmit a CTS frame, responsive to the MU-RTS frame, without setting its NAV according to the duration field of the MU-RTS frame.

In some other aspects, non-legacy STAs that are not members of a restricted TWT SP may be required (such as through implicit signaling) to defer access to the wireless medium for at least a threshold duration at the start of the restricted TWT SP. In some implementations, the non-legacy STAs may be required to reset their RBOs at the start of the restricted TWT SP. As such, each non-legacy STA having data to send or receive at the start of the restricted TWT SP (including low-latency STAs that are members of the SP as well as non-member STAs) must contend for medium access from the start of the restricted TWT SP. In some other implementations, the non-legacy STAs may be required to defer access to the shared wireless medium for the duration of the restricted TWT SP. As such, any non-member STAs having data to send or receive during the restricted TWT SP must refrain from accessing the shared wireless medium until after the restricted TWT SP has ended. Still further, in some aspects, an AP may suppress traffic from all non-legacy STAs that are not members of a restricted TWT SP for at least a threshold duration at the start of the restricted TWT SP. For example, the AP may broadcast beacon frames that include a quiet element indicating a quiet duration associated with the restricted TWT SP. After receiving such beacon frames, any non-member STAs having data to send or receive during the restricted TWT SP must defer access to the shared wireless medium for at least the quiet duration indicated in the beacon frames.

Particular implementations of the subject matter described in this disclosure can be implemented to realize one or more of the following potential advantages. By requiring non-member STAs to defer medium access for a threshold duration at the start of a restricted TWT, through explicit or implicit signaling, aspects of the present disclosure may significantly improve the latency gains achievable by latency-sensitive traffic through application of restricted TWT SPs. For example, under the current rules regarding restricted TWT SPs, a non-member STA that is already in the process of counting down its RBO at the start of a restricted TWT SP may gain access to the shared wireless medium before any low-latency STAs that are members of the SP. However, the additional requirements imposed on non-member STAs (via the signaling techniques of the present disclosure) may protect low-latency STAs from losing medium access at the start of a restricted TWT SP. As such, aspects of the present disclosure may ensure that latency-sensitive traffic is prioritized over all other traffic during a restricted TWT SP. As a result, restricted TWT SPs may provide more predictable latency, reduced worst case latency, or reduced jitter, with higher reliability for latency-sensitive traffic.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The beacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 5-11.

Figure 2:
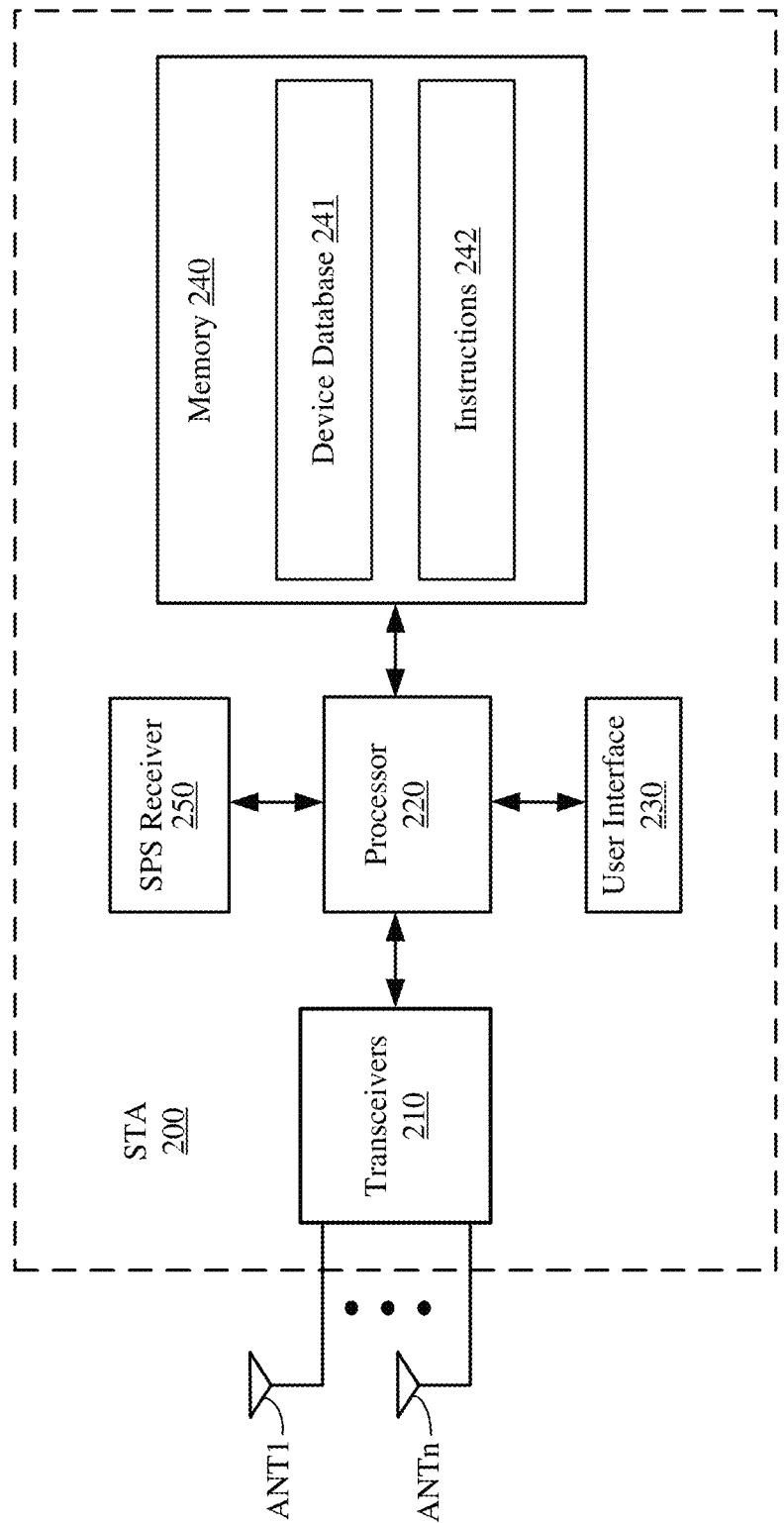
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, a processor 220, a user interface 230, a memory 240, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. Thus, the STA 200 may be configured for MIMO communications and OFDMA communications. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs).

In some implementations, the processor 220 may be a component of a processing system. A processing system may generally refer to a system or series of machines or components that receives inputs and processes the inputs to produce a set of outputs (which may be passed to other systems or components of, for example, the STA 200). For example, a processing system of the STA 200 may refer to a system including the various other components or subcomponents of the STA 200.

The processing system of the STA 200 may interface with other components of the STA 200, and may process information received from other components (such as inputs or signals), output information to other components, and the like. For example, a chip or modem of the STA 200 may be coupled to or include a processing system, a first interface to output information, and a second interface to obtain information. In some instances, the first interface may refer to an interface between the processing system of the chip or modem and a transmitter, such that the STA 200 may transmit information output from the chip or modem. In some instances, the second interface may refer to an interface between the processing system of the chip or modem and a receiver, such that the STA 200 may obtain information or signal inputs, and the information may be passed to the processing system. A person having ordinary skill in the art will readily recognize that the first interface also may obtain information or signal inputs, and the second interface also may output information or signal outputs.

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

Figure 3:
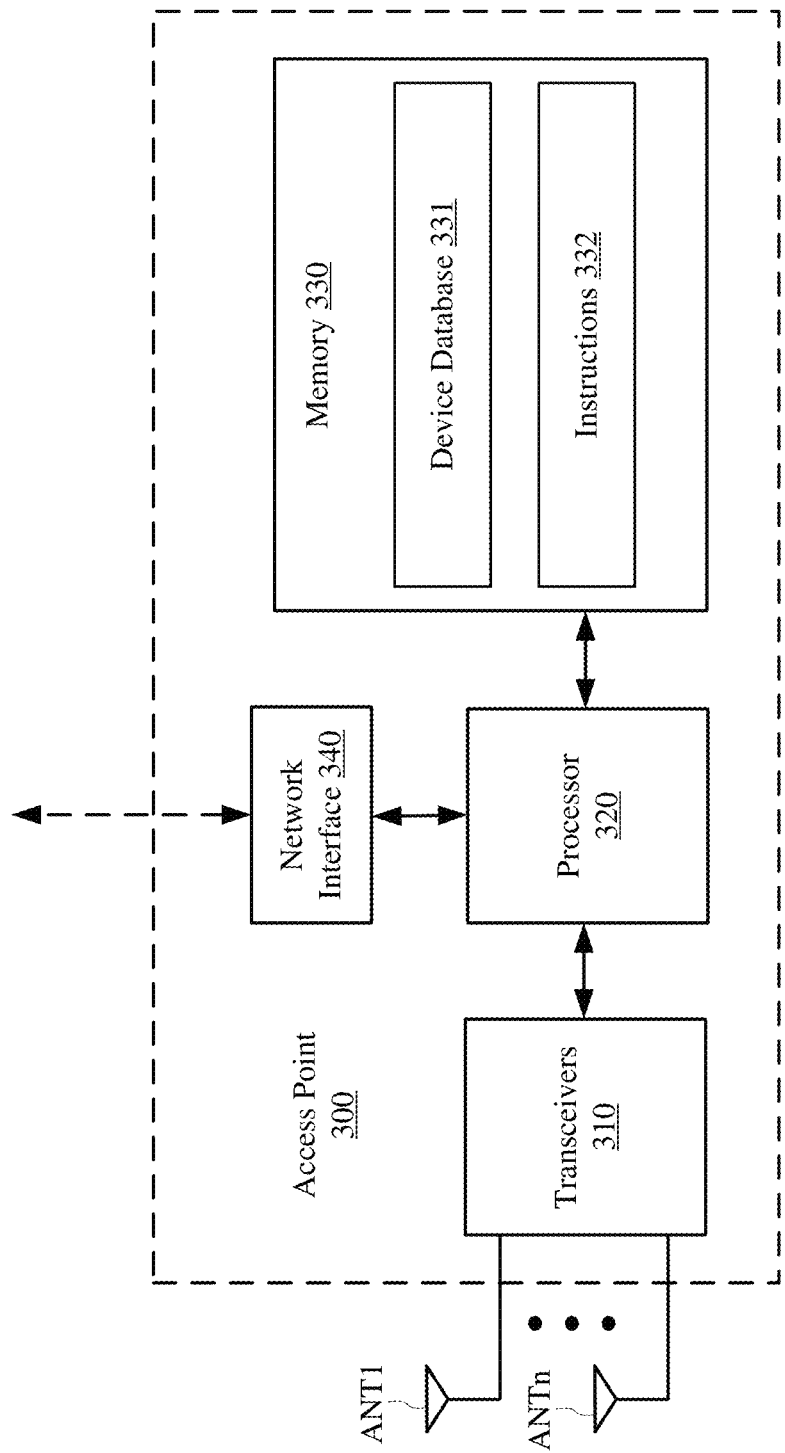
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANT1-ANTn. The transceivers 310 may be coupled to the antennas ANT1-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

In high frequency (such as 60 GHz or millimeter wave (mmWave)) wireless communication systems (such as conforming to the IEEE 802.11ad or 802.11ay amendments of the IEEE 802.11 standard), communications may be beamformed using phased array antennas at the transmitter and the receiver. Beamforming generally refers to a wireless communication technique by which the transmitting device and the receiving device adjust transmit or receive antenna settings to achieve a desired link budget for subsequent communications. The procedure to adapt the transmit and receive antennas, referred to as beamforming training, may be performed initially to establish a link between the transmitting and receiving devices and also may be performed periodically to maintain a quality link using optimized transmit and receive beams.

The processor 320 may be any suitable one or more processors capable of executing scripts or instructions of one or more software programs stored in the AP 300 (such as within the memory 330). In some implementations, the processor 320 may be or include one or more microprocessors providing the processor functionality and external memory providing at least a portion of machine-readable media. In other implementations, the processor 320 may be or include an ASIC with the processor, the bus interface, the user interface, and at least a portion of the machine-readable media integrated into a single chip. In some other implementations, the processor 320 may be or include one or more FPGAs or PLDs. In some implementations, the processor 320 may be a component of a processing system. For example, a processing system of the AP 300 may refer to a system including the various other components or subcomponents of the AP 300.

The processing system of the AP 300 may interface with other components of the AP 300, and may process information received from other components (such as inputs or signals), output information to other components, and the like. For example, a chip or modem of the AP 300 may include a processing system, a first interface to output information, and a second interface to obtain information. In some instances, the first interface may refer to an interface between the processing system of the chip or modem and a transmitter, such that the AP 300 may transmit information output from the chip or modem. In some instances, the second interface may refer to an interface between the processing system of the chip or modem and a receiver, such that the AP 300 may obtain information or signal inputs, and the information may be passed to the processing system. A person having ordinary skill in the art will readily recognize that the first interface also may obtain information or signal inputs, and the second interface also may output information or signal outputs.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory computer-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4A:
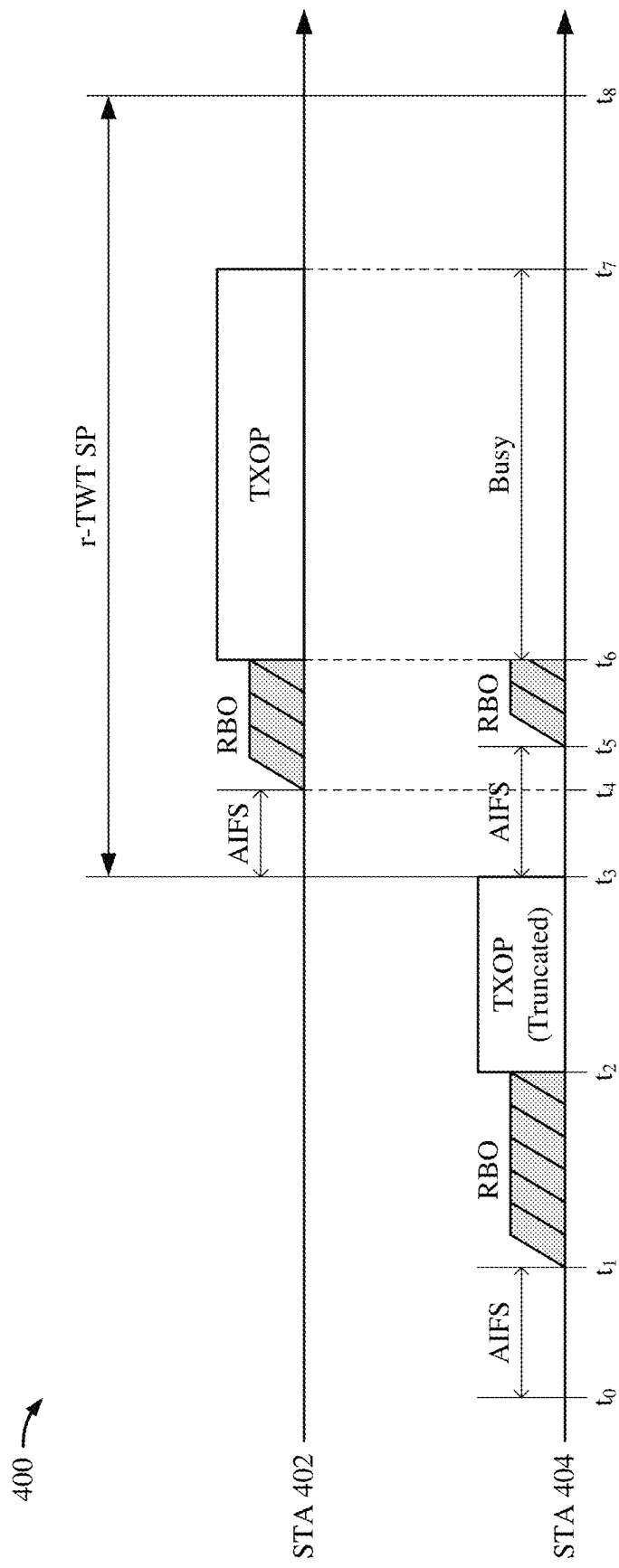
FIG. 4A shows a timing diagram depicting an example of wireless communication among devices belonging to a basic service set (BSS).

FIG. 4A shows a timing diagram 400 depicting an example of wireless communication among devices belonging to a BSS. In the example of FIG. 4A, the BSS is shown to include a low-latency STA 402 and a non-legacy STA 404. The low-latency STA 402 is a member of a restricted TWT SP (r-TWT SP), which spans a duration from times $t_3$ to $t_8$, whereas the non-legacy STA 404 is not a member of the restricted TWT SP (and may thus be referred to as a "non-member STA"). In some implementations, each of the STAs 402 and 404 may be one example of any of the STAs 120a-120i of FIG. 1 or the STA 200 of FIG. 2. Although only one low-latency STA and one non-legacy STA is shown in the example of FIG. 4A, in actual implementations, the BSS may include any number of low-latency STAs and any number of non-legacy STAs.

The non-legacy STA 404 attempts to access a shared wireless medium prior to the start of the restricted TWT SP. More specifically, the non-legacy STA 404 senses that the medium is idle for a threshold duration, from times $t_0$ to $t_1$, based on a channel sensing operation (such as clear channel assessment (CCA)) and further counts down a random backoff (RBO) duration, from times $t_1$ to $t_2$, before attempting to acquire a TXOP. For example, the threshold duration (from times $t_0$ to $t_1$) may be an arbitration interframe spacing (AIFS) duration associated with a particular access category (AC) of data traffic. Accordingly, the RBO duration (from times $t_1$ to $t_2$) may be randomly selected from a range of RBOs spanning a contention window associated with the AC. At time $t_2$, the non-legacy STA 404 senses that the wireless medium is still idle and proceeds to acquire a TXOP, for example, by initiating a transmission over the shared medium. However, the existing rules regarding restricted TWT operation require non-member STAs to terminate their TXOPs by the start of a restricted TWT SP. Because the restricted TWT SP of FIG. 4A starts at time $t_3$, the non-legacy STA 404 must truncate its TXOP between times $t_2$ to $t_3$.

The low-latency STA 402 attempts to access the shared wireless medium at the start of the restricted TWT SP. More specifically, the low-latency STA 402 senses that the medium is idle for an AIFS duration, from times $t_3$ to $t_4$, and further counts down an RBO duration, from times $t_4$ to $t_6$, before attempting to acquire a TXOP. In the example of FIG. 4A, the non-legacy STA 404 also attempts to access the shared wireless medium at the start of the restricted TWT SP. For example, the non-legacy STA 404 senses that the medium is idle for an AIFS duration, from times $t_3$ to $t_5$, and further counts down an RBO duration beginning at time $t_5$. In some implementations, the data traffic associated with the low-latency STA 402 may be assigned to a higher-priority AC than the data traffic associated with the non-legacy STA 404. As such, the AIFS or RBO durations associated with the low-latency STA 402 may be shorter than the AIFS or RBO durations, respectively, associated with the non-legacy STA 404. As a result, the low-latency STA 402 wins access to the wireless medium, at time $t_6$, and acquires a TXOP, for example, by initiating a transmission over the shared medium.

The non-legacy STA 404 senses that the wireless medium is busy, at time $t_6$, and refrains from accessing the shared medium for the duration of the TXOP. After the TXOP has terminated, at time $t_7$, the non-legacy STA 404 may once again attempt to access the wireless medium. In this manner, the restricted TWT operation may prioritize latency-sensitive traffic in the BSS, for example, by requiring other non-legacy STAs to terminate their TXOPs by the start of a restricted TWT SP. Additionally, an AP (not shown for simplicity) may suppress traffic from all legacy STAs associated with the BSS by scheduling a quiet interval to overlap with the restricted TWT SP. For example, the duration of the quiet interval may be indicated by one or more quiet elements included in management frames (such as beacon frames and probe response frames) transmitted by the AP prior to the start of the restricted TWT SP.

Figure 4B:
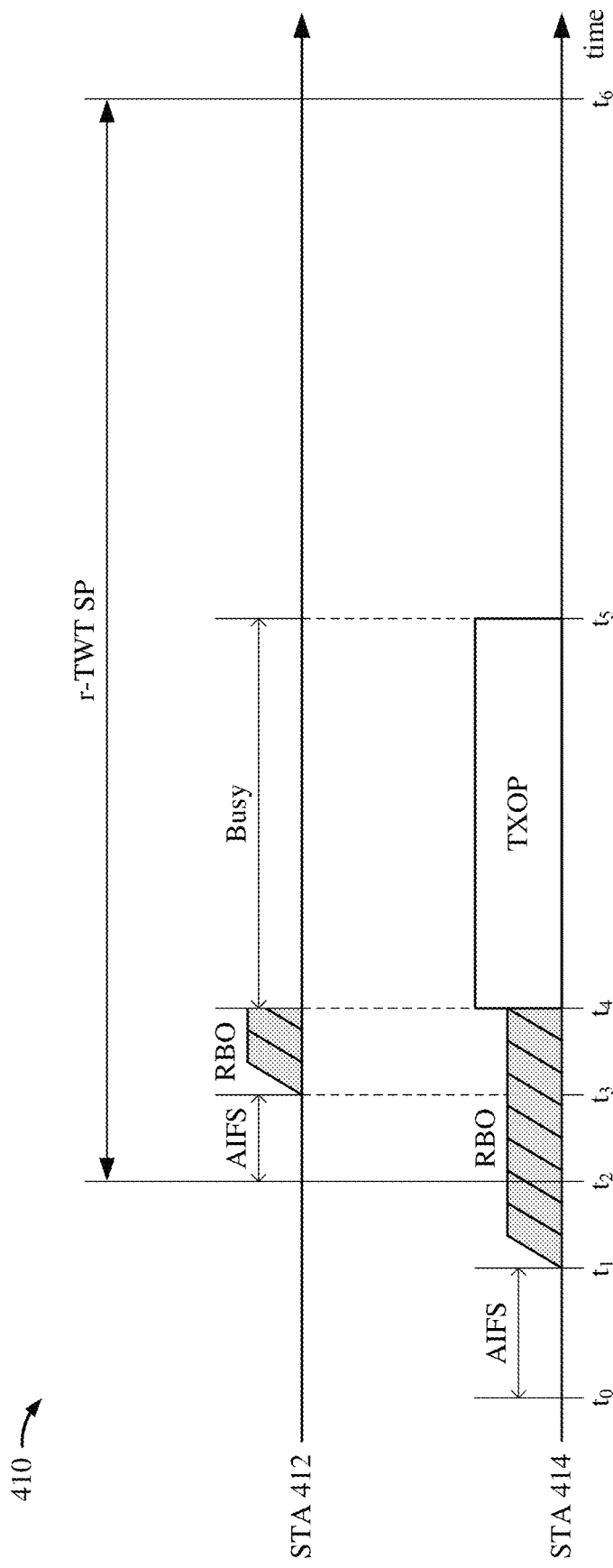
FIG. 4B shows a timing diagram depicting an example of wireless communication among devices belonging to a BSS.

FIG. 4B shows a timing diagram 410 depicting an example of wireless communication among devices belonging to a BSS. In the example of FIG. 4B, the BSS is shown to include a low-latency STA 412 and a non-legacy STA 414. The low-latency STA 412 is a member of a restricted TWT SP (r-TWT SP), which spans a duration from times $t_2$ to $t_6$, whereas the non-legacy STA 414 is not a member of the restricted TWT SP (and may thus be referred to as a "non-member STA"). In some implementations, each of the STAs 412 and 414 may be one example of any of the STAs 120a-120i of FIG. 1 or the STA 200 of FIG. 2. Although only one low-latency STA and one non-legacy STA is shown in the example of FIG. 4B, in actual implementations, the BSS may include any number of low-latency STAs and any number of non-legacy STAs.

The non-legacy STA 414 attempts to access a shared wireless medium prior to the start of the restricted TWT SP. More specifically, the non-legacy STA 414 senses that the medium is idle for an AIFS duration, from times $t_0$ to $t_1$, and further counts down an RBO duration, from times $t_1$ to $t_4$, before attempting to acquire a TXOP. In the example of FIG. 4B, the RBO duration randomly selected by the non-legacy STA 414 is greater than the amount of time remaining before the start of the restricted TWT SP (from times $t_1$ to $t_2$). However, the existing rules regarding restricted TWT operation do not prevent RBO countdowns from extending beyond the start of a restricted TWT SP. Thus, at time $t_4$, the non-legacy STA 414 senses that the wireless medium is still idle and proceeds to acquire a TXOP, for example, by initiating a transmission over the shared wireless medium. As a result, the non-legacy STA 414 gains access to the shared wireless medium, from times $t_4$ to $t_5$, during the restricted TWT SP. Because the non-legacy STA 414 does not acquire its TXOP before the start of the restricted TWT SP, the TXOP (from times $t_4$ to $t_5$) does not violate any existing rules regarding restricted TWT operation.

The low-latency STA 412 attempts to access the shared wireless medium at the start of the restricted TWT SP. More specifically, the low-latency STA 412 senses that the medium is idle for an AIFS duration, from times $t_2$ to $t_3$, and further counts down an RBO duration beginning at time $t_3$. In some implementations, the data traffic associated with the low-latency STA 412 may be assigned to a higher-priority AC than the data traffic associated with the non-legacy STA 414. As such, the AIFS or RBO durations associated with the low-latency STA 412 may be shorter than the AIFS or RBO durations, respectively, associated with the non-legacy STA 414. However, because the non-legacy STA 414 initiated its RBO countdown before the start of the restricted TWT SP, the non-legacy STA 414 is able to acquire a TXOP before the low-latency STA 412 completes its RBO countdown. As a result, the low-latency STA 412 senses that the wireless medium is busy, at time $t_4$, and refrains from accessing the shared wireless medium for the duration of the TXOP of the non-legacy STA 414. After the TXOP has terminated, at time $t_5$, the low-latency STA 412 may once again attempt to access the wireless medium.

Figure 4C:
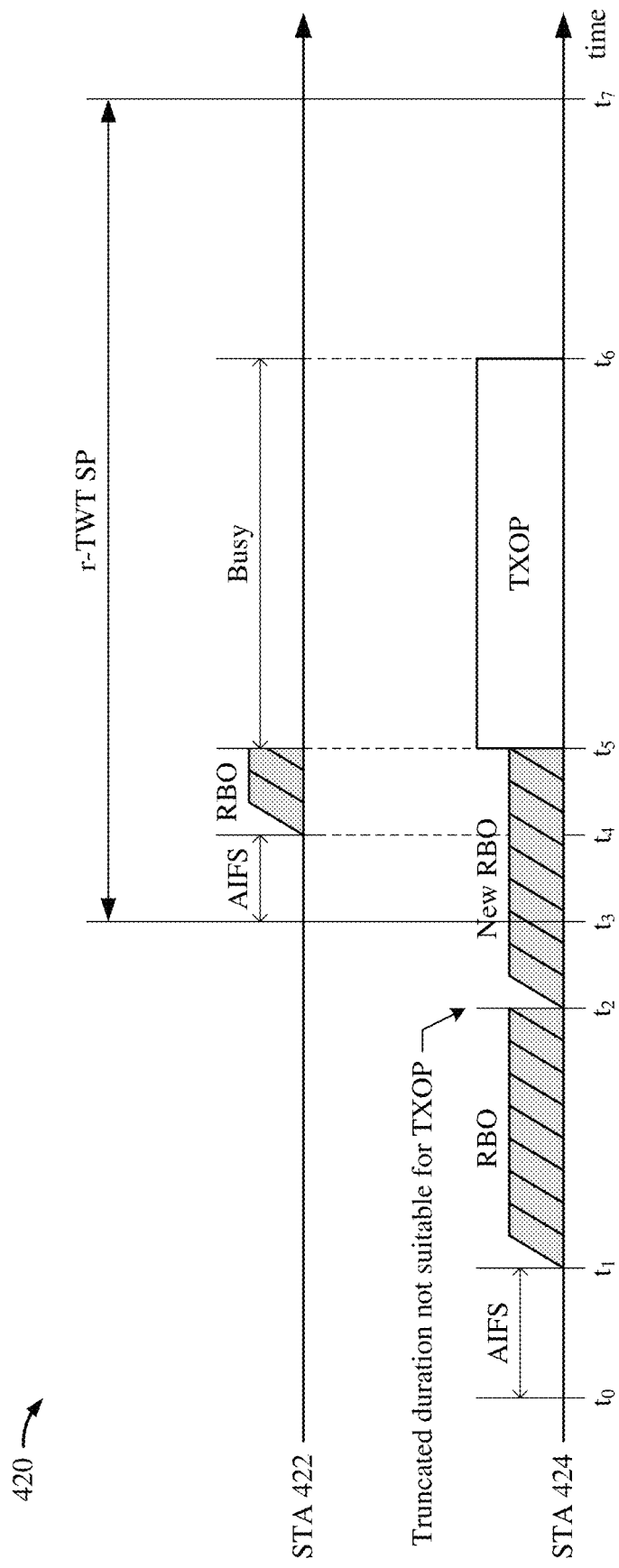
FIG. 4C shows a timing diagram depicting an example of wireless communication among devices belonging to a BSS.

FIG. 4C shows a timing diagram 420 depicting an example of wireless communication among devices belonging to a BSS. In the example of FIG. 4C, the BSS is shown to include a low-latency STA 422 and a non-legacy STA 424. The low-latency STA 422 is a member of a restricted TWT SP (r-TWT SP), which spans a duration from times $t_3$ to $t_7$, whereas the non-legacy STA 424 is not a member of the restricted TWT SP (and may thus be referred to as a "non-member STA"). In some implementations, each of the STAs 422 and 424 may be one example of any of the STAs 120a-120i of FIG. 1 or the STA 200 of FIG. 2. Although only one low-latency STA and one non-legacy STA is shown in the example of FIG. 4C, in actual implementations, the BSS may include any number of low-latency STAs and any number of non-legacy STAs.

The non-legacy STA 424 attempts to access a shared wireless medium prior to the start of the restricted TWT SP. More specifically, the non-legacy STA 424 senses that the medium is idle for an AIFS duration, from times $t_0$ to $t_1$, and further counts down an RBO duration, from times $t_1$ to $t_2$, before attempting to acquire a TXOP. In the example of FIG. 4C, the RBO countdown terminates (at time $t_2$) before the start of the restricted TWT SP. However, the non-legacy STA 424 may determine that the duration between the end of the RBO countdown and the start of the restricted TWT SP (from times $t_2$ to $t_3$) is not suitable for a (truncated) TXOP. Thus, in some implementations, the non-legacy STA 424 may perform a new RBO countdown from times $t_2$ to $t_5$. At time $t_5$, the non-legacy STA 424 senses that the wireless medium is still idle and proceeds to acquire a TXOP, for example, by initiating a transmission over the shared wireless medium. As a result, the non-legacy STA 424 gains access to the shared wireless medium, from times $t_5$ to $t_6$, during the restricted TWT SP. Because the non-legacy STA 424 does not acquire its TXOP before the start of the restricted TWT SP, the TXOP (from times $t_5$ to $t_6$) does not violate any existing rules regarding restricted TWT operation.

The low-latency STA 422 attempts to access the shared wireless medium at the start of the restricted TWT SP. More specifically, the low-latency STA 422 senses that the medium is idle for an AIFS duration, from times $t_3$ to $t_4$, and further counts down an RBO duration beginning at time $t_4$.

In some implementations, the data traffic associated with the low-latency STA 422 may be assigned to a higher-priority AC than the data traffic associated with the non-legacy STA 424. As such, the AIFS or RBO durations associated with the low-latency STA 422 may be shorter than the AIFS or RBO durations, respectively, associated with the non-legacy STA 424. However, because the non-legacy STA 424 initiated its second RBO countdown before the start of the restricted TWT SP, the non-legacy STA 424 is able to acquire a TXOP before the low-latency STA 422 completes its RBO countdown. As a result, the low-latency STA 422 senses that the wireless medium is busy, at time $t_5$, and refrains from accessing the shared wireless medium for the duration of the TXOP of the non-legacy STA 424. After the TXOP has terminated, at time $t_6$, the low-latency STA 422 may once again attempt to access the wireless medium.

FIGS. 4B and 4C show that, under various conditions, a non-member STA can acquire a TXOP, during a restricted TWT SP, before a low-latency STA that is a member of the restricted TWT SP. Although the low-latency STA may access the wireless medium upon completion of the TXOP of the non-member STA, such delay in medium access may significantly increase the latency of data traffic associated with the low-latency STA 412. As such, the existing rules regarding restricted TWT operation may not provide adequate protection for latency-sensitive traffic. Aspects of the present disclosure may provide greater protections for latency-sensitive traffic by preventing non-member STAs from accessing the shared wireless medium for at least a threshold duration following the start of a restricted TWT SP. In some aspects, all non-member STAs may follow one or more rules that require such STAs to defer access to the shared wireless medium for at least a threshold duration at the start of each restricted TWT SP. In some other aspects, an AP may transmit one or more frames that cause all non-member STAs to defer access to the shared wireless medium for at least a threshold duration at the start of a restricted TWT SP.

Figure 5:
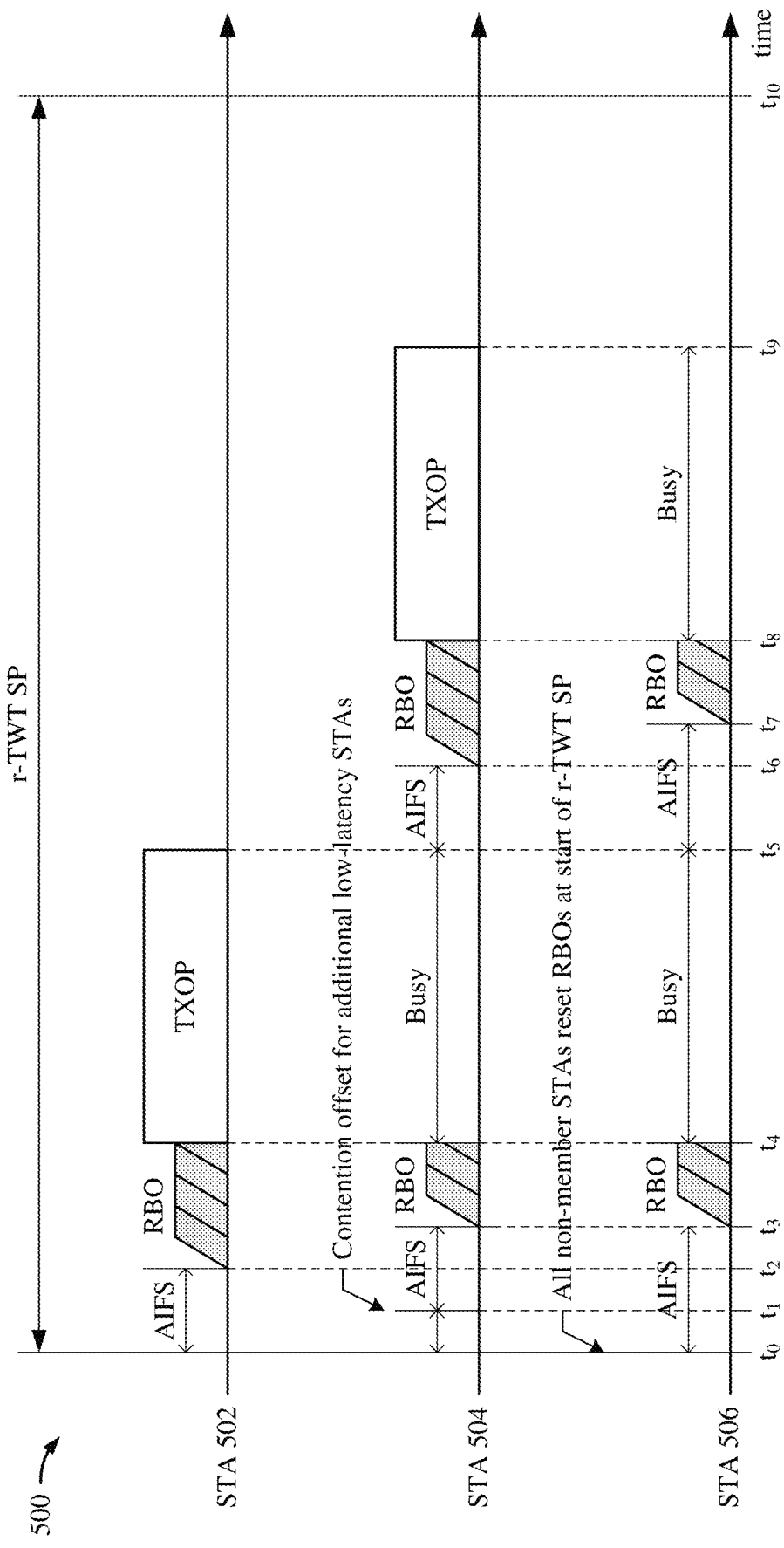
FIG. 5 shows a timing diagram depicting an example of wireless communication among devices belonging to a BSS.

FIG. 5 shows a timing diagram 500 depicting an example of wireless communication among devices belonging to a BSS. In the example of FIG. 5, the BSS is shown to include low-latency STAs 502 and 504 and a non-legacy STA 506. The low-latency STAs 502 and 504 are members of a restricted TWT SP (r-TWT SP), which spans a duration from times $t_0$ to $t_{10}$, whereas the non-legacy STA 506 is not a member of the restricted TWT SP. In some implementations, each of the STAs 502-506 may be one example of any of the STAs 120a-120i of FIG. 1 or the STA 200 of FIG. 2. Although only two low-latency STAs and one non-legacy STA is shown in the example of FIG. 5, in actual implementations, the BSS may include any number of low-latency STAs and any number of non-legacy STAs.

The first low-latency STA 502 attempts to access the shared wireless medium at the start of the restricted TWT SP. More specifically, the first low-latency STA 502 senses that the medium is idle for an AIFS duration, from times $t_0$ to $t_2$, and further counts down an RBO duration, from times $t_2$ to $t_4$, before attempting to acquire a TXOP. In the example of FIG. 5, the second low-latency STA 504 also attempts to access the shared wireless medium at the start of the restricted TWT SP.

In some implementations, to reduce the likelihood of collisions between the low-latency STAs 502 and 504, the second low-latency STA 504 may wait a contention offset duration, from times $t_0$ to $t_1$, before contending for medium access. As a result, the first low-latency STA 502 wins access to the wireless medium and acquires a TXOP from times $t_4$ to $t_5$. During the TXOP, the first low-latency STA 502 may transmit latency-sensitive traffic to, or receive latency-sensitive traffic from, an AP or another STA (such as in a peer-to-peer communication). The second low-latency STA 504 senses that the medium is idle for an AIFS duration, from times $t_1$ to $t_3$, and further counts down an RBO duration beginning at time $t_3$. However, the second low-latency STA 504 senses that the wireless medium is busy, at time $t_4$, and refrains from accessing the shared medium for the duration of the TXOP.

In some implementations, all non-legacy STAs may be required to reset their RBOs at the start of each restricted TWT SP. In other words, any non-member STA having data to transmit or receive during a restricted TWT SP must contend for medium access from the beginning of the restricted TWT SP. The non-legacy STA 506 may attempt to access a shared wireless medium prior to the start of the restricted TWT SP (such as described with reference to FIGS. 4A-4C). However, regardless of whether the non-legacy STA 506 acquires a truncated TXOP or continues to count down an RBO, the non-legacy STA 506 must contend again for medium access at the start of the restricted TWT SP.

The non-legacy STA 506 senses that the medium is idle for an AIFS duration, from times $t_0$ to $t_3$, and further counts down an RBO duration beginning at time $t_3$. In some implementations, the data traffic associated with the non-legacy STA 506 may be assigned to a lower-priority AC than the data traffic associated with the low-latency STAs 502 and 504. As a result, the non-legacy STA 506 loses medium access to the first low-latency STA 502. The non-legacy STA 506 senses that the wireless medium is busy, at time $t_4$, and refrains from accessing the shared medium for the duration of the TXOP.

After the TXOP of the first low-latency STA 502 has terminated, at time $t_5$, the second low-latency STA 504 and the non-legacy STA 506 may contend once more for access to the wireless medium. As shown in FIG. 5, the second low-latency STA 504 senses that the medium is idle for an AIFS duration, from times $t_5$ to $t_6$, and further counts down an RBO duration, from times $t_6$ to $t_5$, before attempting to acquire a TXOP. The non-legacy STA 506 senses that the medium is idle for an AIFS duration, from times $t_5$ to $t_7$, and further counts down an RBO duration beginning at time $t_7$.

In some implementations, the data traffic associated with the second low-latency STA 504 may be assigned to a higher-priority AC than the data traffic associated with the non-legacy STA 506. As a result, the second low-latency STA 504 wins access to the wireless medium and acquires a TXOP from times $t_5$ to $t_9$. The non-legacy STA 506 senses that the wireless medium is busy, at time $t_5$, and refrains from accessing the shared medium for the duration of the TXOP. After the TXOP of the second low-latency STA 504 has terminated, at time $t_9$, the non-legacy STA 506 may contend once more for access to the wireless medium.

In some implementations, membership in a restricted TWT SP may be limited so that each low-latency STA associated with the SP has a greater likelihood of gaining a TXOP in a relatively short amount of time. With reference for example to FIG. 5, if membership in the restricted TWT SP is limited to 2, any additional low-latency STAs in the BSS may be assigned to a different restricted TWT SP.

In the example of FIG. 5, it is assumed that the data traffic associated with the non-legacy STA 506 is assigned to a lower-priority AC than the data traffic associated with the low-latency STAs 502 and 504. However, in some instances, the data traffic associated with each of the STAs 502-506 may be assigned to the same AC. In such instances, the likelihood of either of the low-latency STAs 502 or 504 winning access to the wireless medium over the non-legacy STA 506 is significantly reduced. In some implementations, to further protect latency-sensitive traffic in restricted TWT SPs, non-member STAs may be prohibited from accessing the wireless medium during a restricted TWT SP.

Figure 6:
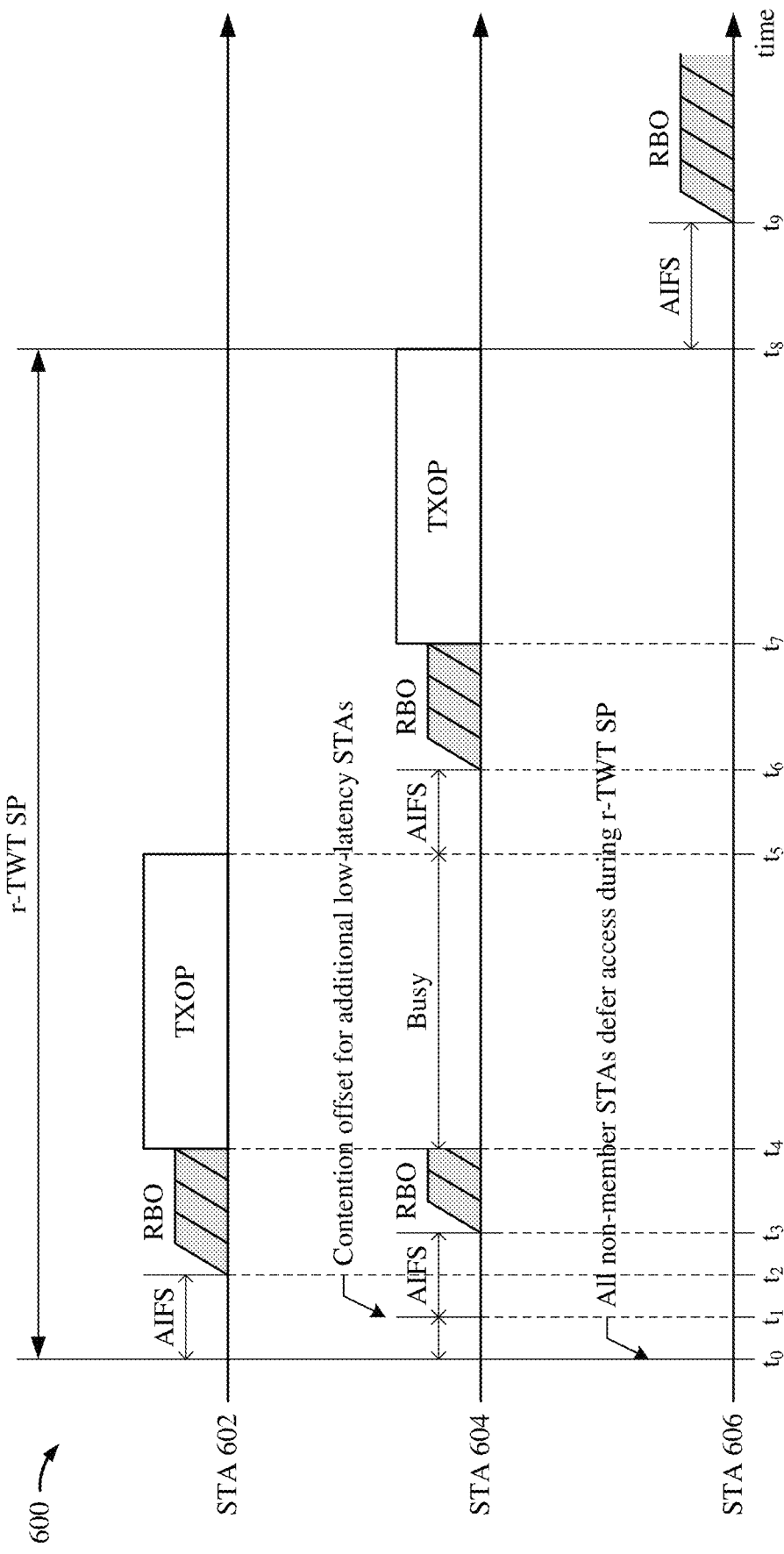
FIG. 6 shows a timing diagram depicting an example of wireless communication among devices belonging to a BSS.

FIG. 6 shows a timing diagram 600 depicting an example of wireless communication among devices belonging to a BSS. In the example of FIG. 6, the BSS is shown to include low-latency STAs 602 and 604 and a non-legacy STA 606. The low-latency STAs 602 and 604 are members of a restricted TWT SP (r-TWT SP), which spans a duration from times $t_0$ to $t_8$, whereas the non-legacy STA 606 is not a member of the restricted TWT SP. In some implementations, each of the STAs 602-606 may be one example of any of the STAs 120a-120i of FIG. 1 or the STA 200 of FIG. 2. Although only two low-latency STAs and one non-legacy STA is shown in the example of FIG. 6, in actual implementations, the BSS may include any number of low-latency STAs and any number of non-legacy STAs.

The first low-latency STA 602 attempts to access the shared wireless medium at the start of the restricted TWT SP. More specifically, the first low-latency STA 602 senses that the medium is idle for an AIFS duration, from times $t_0$ to $t_2$, and further counts down an RBO duration, from times $t_2$ to $t_4$, before attempting to acquire a TXOP. In the example of FIG. 6, the second low-latency STA 604 also attempts to access the shared wireless medium at the start of the restricted TWT SP.

In some implementations, to reduce the likelihood of collisions between the low-latency STAs 602 and 604, the second low-latency STA 604 may wait a contention offset duration, from times $t_0$ to $t_1$, before contending for medium access. As a result, the first low-latency STA 602 wins access to the wireless medium and acquires a TXOP from times $t_4$ to $t_5$. During the TXOP, the first low-latency STA 602 may transmit latency-sensitive traffic to, or receive latency-sensitive traffic from, an AP or another STA (such as in a peer-to-peer communication). The second low-latency STA 604 senses that the medium is idle for an AIFS duration, from times $t_1$ to $t_3$, and further counts down an RBO duration beginning at time $t_3$. However, the second low-latency STA 604 senses that the wireless medium is busy, at time $t_4$, and refrains from accessing the shared medium for the duration of the TXOP.

In some implementations, all non-legacy STAs may be required to defer access to the shared wireless medium for the duration of each restricted TWT SP. In other words, any non-member STA having data to transmit or receive during a restricted TWT SP must wait until the restricted TWT SP has terminated before contending for medium access. The non-legacy STA 606 may attempt to access the wireless medium prior to the start of the restricted TWT SP (such as described with reference to FIGS. 4A-4C). However, regardless of whether the non-legacy STA 606 acquires a truncated TXOP or continues to count down an RBO, the non-legacy STA 606 must defer medium access for the duration of the restricted TWT SP, from times $t_0$ to $t_8$.

After the TXOP of the first low-latency STA 602 has terminated, at time $t_5$, the second low-latency STA 604 may contend once more for access to the wireless medium. As shown in FIG. 6, the second low-latency STA 604 senses that the medium is idle for an AIFS duration, from times $t_5$ to $t_6$, counts down an RBO duration, from times $t_6$ to $t_7$, and acquires a TXOP from times $t_7$ to $t_5$. After the restricted TWT SP has terminated, at time $t_5$, the non-legacy STA 606 may contend once more for access to the wireless medium. As shown in FIG. 6, the non-legacy STA 606 senses that the medium is idle for an AIFS duration, from times $t_5$ to $t_9$, and further counts down an RBO duration beginning at time $t_9$.

In some implementations, membership in a restricted TWT SP may be limited so that each low-latency STA associated with the SP has a greater likelihood of gaining a TXOP in a relatively short amount of time. With reference for example to FIG. 6, if membership in the restricted TWT SP is limited to 2, any additional low-latency STAs in the BSS may be assigned to a different restricted TWT SP.

Aspects of the present disclosure recognize that, in some instances, the low-latency STAs assigned to a restricted TWT SP may not utilize all (or any) of the SP to transmit or receive latency-sensitive traffic. In such instances, requiring non-member STAs to defer medium access for the duration of the restricted TWT SP may result in underutilization of the shared wireless medium. In some implementations, to improve medium utilization during restricted TWT SPs, non-member STAs may be required to defer medium access for only a portion of a restricted TWT SP.

Figure 7:
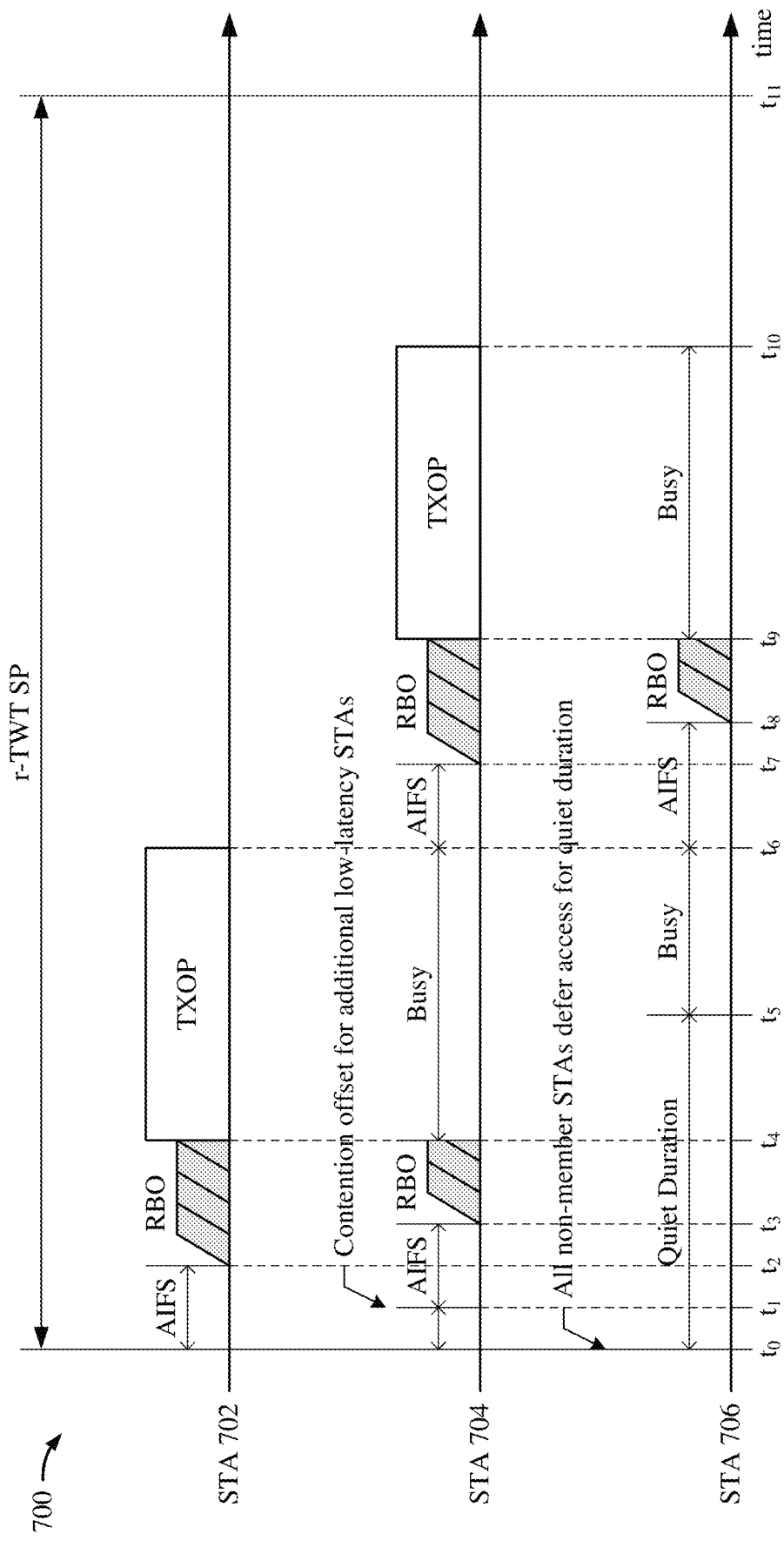
FIG. 7 shows a timing diagram depicting an example of wireless communication among devices belonging to a BSS.

FIG. 7 shows a timing diagram 700 depicting an example of wireless communication among devices belonging to a BSS. In the example of FIG. 7, the BSS is shown to include low-latency STAs 702 and 704 and a non-legacy STA 706. The low-latency STAs 702 and 704 are members of a restricted TWT SP (r-TWT SP), which spans a duration from times $t_0$ to $t_{11}$, whereas the non-legacy STA 706 is not a member of the restricted TWT SP. In some implementations, each of the STAs 702-706 may be one example of any of the STAs 120a-120i of FIG. 1 or the STA 200 of FIG. 2. Although only two low-latency STAs and one non-legacy STA is shown in the example of FIG. 7, in actual implementations, the BSS may include any number of low-latency STAs and any number of non-legacy STAs.

The first low-latency STA 702 attempts to access the shared wireless medium at the start of the restricted TWT SP. More specifically, the first low-latency STA 702 senses that the medium is idle for an AIFS duration, from times $t_0$ to $t_2$, and further counts down an RBO duration, from times $t_2$ to $t_4$, before attempting to acquire a TXOP. In the example of FIG. 7, the second low-latency STA 704 also attempts to access the shared wireless medium at the start of the restricted TWT SP.

In some implementations, to reduce the likelihood of collisions between the low-latency STAs 702 and 704, the second low-latency STA 704 may wait a contention offset duration, from times $t_0$ to $t_1$, before contending for medium access. As a result, the first low-latency STA 702 wins access to the wireless medium and acquires a TXOP from times $t_4$ to $t_6$. During the TXOP, the first low-latency STA 702 may transmit latency-sensitive traffic to, or receive latency-sensitive traffic from, an AP or another STA (such as in a peer-to-peer communication). The second low-latency STA 704 senses that the medium is idle for an AIFS duration, from times $t_1$ to $t_3$, and further counts down an RBO duration beginning at time $t_3$. However, the second low-latency STA 704 senses that the wireless medium is busy, at time $t_4$, and refrains from accessing the shared medium for the duration of the TXOP.

In some implementations, all non-legacy STAs may be required to defer access to the shared wireless medium for a quiet duration from the start of each restricted TWT SP. In other words, any non-member STA having data to transmit or receive during a restricted TWT SP must wait until the quiet duration has expired before it can contend for medium access. In some implementations, the quiet duration may be signaled by an AP (not shown for simplicity). For example, the quiet duration may be indicated by a quiet element carried in management frames (such as beacons or probe responses) transmitted by the AP. The non-legacy STA 706 may attempt to access the wireless medium prior to the start of the restricted TWT SP (such as described with reference to FIGS. 4A-4C). However, regardless of whether the non-legacy STA 706 acquires a truncated TXOP or continues to count down an RBO, the non-legacy STA 706 must defer medium access for at least a quiet duration, from times $t_0$ to $t_5$.

The non-legacy STA 706 senses that the wireless medium is busy for the remainder of the TXOP, from times $t_5$ to $t_6$. After the TXOP of the first low-latency STA 702 has terminated, at time $t_6$, the second low-latency STA 704 and the non-legacy STA 706 may contend once more for access to the wireless medium. As shown in FIG. 7, the second low-latency STA 704 senses that the medium is idle for an AIFS duration, from times $t_6$ to $t_7$, and further counts down an RBO duration, from times $t_7$ to $t_9$, before attempting to acquire a TXOP. The non-legacy STA 706 senses that the medium is idle for an AIFS duration, from times $t_6$ to $t_8$, and further counts down an RBO duration beginning at time $t_5$.

In some implementations, the data traffic associated with the second low-latency STA 704 may be assigned to a higher-priority AC than the data traffic associated with the non-legacy STA 706. As a result, the second low-latency STA 704 wins access to the wireless medium and acquires a TXOP from times $t_9$ to $t_{10}$. The non-legacy STA 706 senses that the wireless medium is busy, at time $t_9$, and refrains from accessing the shared medium for the duration of the TXOP. After the TXOP of the second low-latency STA 704 has terminated, at time $t_{10}$, the non-legacy STA 706 may contend once more for access to the wireless medium In some implementations, membership in a restricted TWT SP may be limited so that each low-latency STA associated with the SP has a greater likelihood of gaining a TXOP in a relatively short amount of time. With reference for example to FIG. 7, if membership in the restricted TWT SP is limited to 2, any additional low-latency STAs in the BSS may be assigned to a different restricted TWT SP.

In some implementations, the quiet duration may be selected to balance the efficiency of medium utilization with latency gains for latency-sensitive traffic. In the example of FIG. 7, the quiet duration is configured to terminate before the end of a single TXOP. However, in some other implementations, the quiet duration may be configured to span one or multiple TXOPs.

The implementations described with reference to FIGS. 5-7 rely on non-member STAs following updated rules regarding restricted TWT operation. For example, such updates to the rules may be implemented through future amendments to the IEEE 802.11 standard. However, aspects of the present disclosure recognize that non-legacy STAs conforming to existing versions of the IEEE 802.11 standard may not follow the updated rules. Thus, in some other implementations, non-member STAs may be explicitly signaled to defer medium access using existing wireless communication protocols. In such implementations, an AP may capture the wireless medium at the beginning of the TWT SP and transmit one or more packets that cause non-member STAs to defer medium access for at least a threshold interval while allowing low-latency STAs to access the wireless medium during such interval.

Figure 8A:
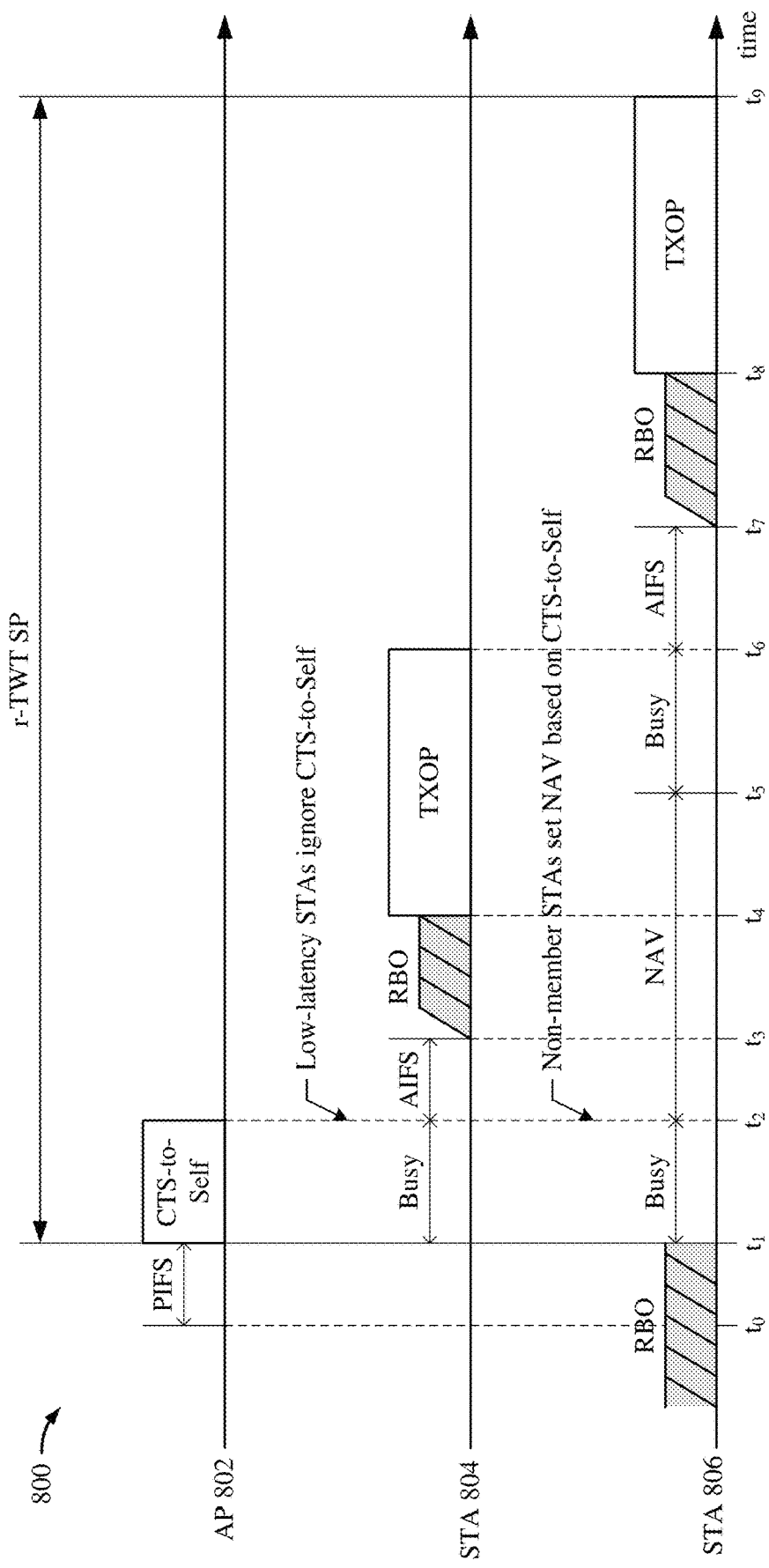
FIG. 8A shows a timing diagram depicting an example of wireless communication among devices belonging to a BSS.

FIG. 8A shows a timing diagram 800 depicting an example of wireless communication among devices belonging to a BSS. In the example of FIG. 8A, the BSS is shown to include an AP 802, a low-latency STA 804, and a non-legacy STA 806. The low-latency STA 804 is a member of a restricted TWT SP (r-TWT SP), which spans a duration from times $t_1$ to $t_9$, whereas the non-legacy STA 806 is not a member of the restricted TWT SP. In some implementations, the AP 802 may be one example of the AP 110 of FIG. 1 or the AP 300 of FIG. 3. In some implementations, each of the STAs 804 and 806 may be one example of any of the STAs 120a-120i of FIG. 1 or the STA 200 of FIG. 2. Although only one low-latency STA and one non-legacy STA is shown in the example of FIG. 8A, in actual implementations, the BSS may include any number of low-latency STAs and any number of non-legacy STAs.

In some implementations, the AP 802 may transmit a clear-to-send (CTS)-to-self frame over a shared wireless medium at the beginning of the restricted TWT SP. More specifically, the AP 802 attempts to time the transmission of the CTS-to-self frame to coincide with the start of the restricted TWT SP. In the example of FIG. 8A, the non-legacy STA 806 is counting down its RBO duration before the start of the restricted TWT SP. The AP 802 senses that the medium is idle for a point coordination function (PCF) interframe space (PIFS) duration, from times $t_0$ to $t_1$, and proceeds to transmit the CTS-to-self frame at time $t_1$. The low-latency STA 804 also attempts to access the shared wireless medium at the start of the restricted TWT SP. However, the low-latency STA 804 senses that the medium is busy, from times $t_1$ to $t_2$, during the transmission of the CTS-to-self frame.

In some implementations, a duration field (in the MAC header) of the CTS-to-self frame may be used to protect latency-sensitive traffic in the restricted TWT SP. More specifically, the value of the duration field indicates a duration for which the wireless medium is to be reserved. STAs that conform to existing versions of the IEEE 802.11 standard must defer medium access for at least the duration indicated by the duration field. In some implementations, to protect the latency-sensitive traffic in the restricted TWT SP, the duration indicated by the duration field may be greater than a duration needed to transmit the trigger frame. As shown in FIG. 8A, the non-legacy STA 806 sets its network allocation vector (NAV) to the duration indicated by the duration field of the CTS-to-self frame, which spans a duration from times $t_2$ to $t_5$.

In some implementations, low-latency STAs may be configured to ignore any CTS-to-self frames transmitted by an AP at the start of a restricted TWT SP. Thus, the low-latency STA 804 does not set its NAV according to the duration field of the CTS-to-self frame. Instead, the low-latency STA 804 may begin contending for medium access immediately following the transmission of the CTS-to-self frame. As shown in FIG. 8A, the low-latency STA 804 senses that the medium is idle for an AIFS duration, from times $t_2$ to $t_3$, counts down an RBO duration, from times $t_3$ to $t_4$, and acquires a TXOP, from times $t_4$ to $t_6$. During the TXOP, the low-latency STA 804 may transmit latency-sensitive traffic to, or receive latency-sensitive traffic from, an AP or another STA (such as in a peer-to-peer communication).

At the end of the NAV duration, at time $t_5$, the non-legacy STA 806 may contend for medium access. However, the non-legacy STA 806 senses that the medium is busy, at time $t_5$ due to the TXOP of the low-latency STA 804. Thus, the non-legacy STA 806 refrains from accessing the shared medium for the duration of the TXOP. After the TXOP of the low-latency STA 804 has terminated, at time $t_6$, the non-legacy STA 806 may once again contend for medium access.

As shown in FIG. 8A, the non-legacy STA 806 senses that the medium is idle for an AIFS duration, from times $t_6$ to $t_7$, counts down an RBO duration, from times $t_7$ to $t_8$, and acquires a TXOP, from times $t_8$ to $t_9$.

In some implementations, multiple low-latency STAs may be members of the restricted TWT SP. In such implementations, the non-legacy STA 806 may defer its medium access even longer (such as described with reference to FIGS. 5-7). For example, because the data traffic associated with a low-latency STA may be assigned to a higher-priority AC than the data traffic associated with a non-member STA, the low-latency STA is more likely to win medium access over the non-member STA during a given contention period.

In some implementations, membership in a restricted TWT SP may be limited so that each low-latency STA associated with the SP has a greater likelihood of gaining a TXOP in a relatively short amount of time. With reference for example to FIG. 8A, if membership in the restricted TWT SP is limited to 2, any additional low-latency STAs in the BSS may be assigned to a different restricted TWT SP.

In some implementations, the duration indicated by the duration field of the CTS-to-self frame (also referred to herein as the "NAV duration") may be selected to balance the efficiency of medium utilization with latency gains for latency-sensitive traffic. In the example of FIG. 8A, the NAV duration is configured to terminate before the end of a single TXOP. However, in some other implementations, the NAV duration may be configured to span one or multiple TXOPs.

Figure 8B:
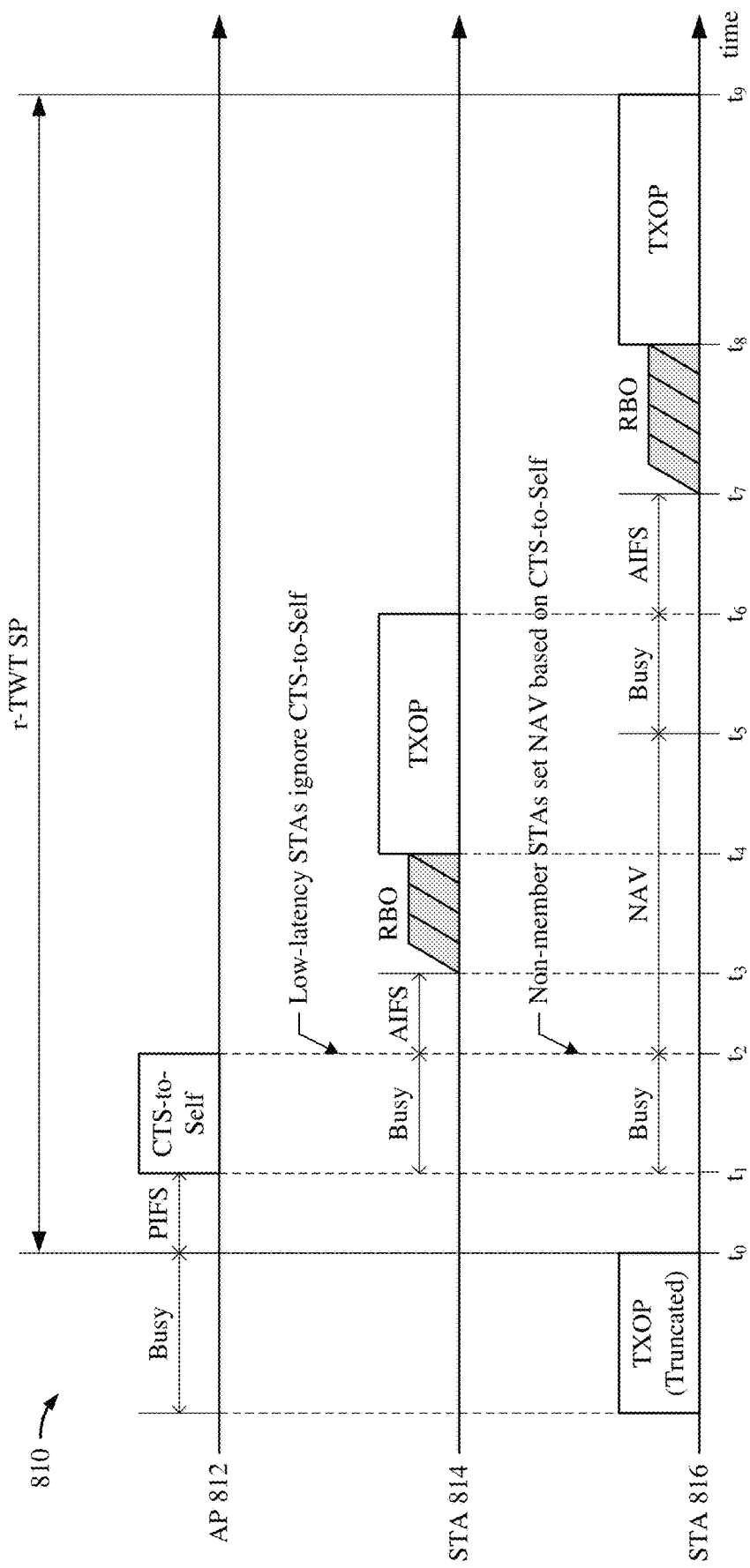
FIG. 8B shows a timing diagram depicting an example of wireless communication among devices belonging to a BSS.

FIG. 8B shows a timing diagram 810 depicting an example of wireless communication among devices belonging to a BSS. In the example of FIG. 8B, the BSS is shown to include an AP 812, a low-latency STA 814, and a non-legacy STA 816. The low-latency STA 814 is a member of a restricted TWT SP (r-TWT SP), which spans a duration from times $t_0$ to $t_9$, whereas the non-legacy STA 816 is not a member of the restricted TWT SP. In some implementations, the AP 812 may be one example of the AP 110 of FIG. 1 or the AP 300 of FIG. 3. In some implementations, each of the STAs 814 and 816 may be one example of any of the STAs 120a-120i of FIG. 1 or the STA 200 of FIG. 2. Although only one low-latency STA and one non-legacy STA is shown in the example of FIG. 8B, in actual implementations, the BSS may include any number of low-latency STAs and any number of non-legacy STAs.

In some implementations, the AP 812 may transmit a CTS-to-self frame over a shared wireless medium at the beginning of the restricted TWT SP. More specifically, the AP 812 attempts to time the transmission of the CTS-to-self frame to coincide with the start of the restricted TWT SP. In the example of FIG. 8B, the non-legacy STA 816 acquires a truncated TXOP before the start of the restricted TWT SP. The AP 812 senses that the medium is idle for a PIFS duration, from times $t_0$ to $t_1$, and proceeds to transmit a CTS-to-self frame at time $t_1$. The low-latency STA 814 also attempts to access the shared wireless medium at the start of the restricted TWT SP. However, because a PIFS duration is shorter than any AIFS duration, the AP 812 wins medium access over the low-latency STA 814. Thus, the low-latency STA 814 senses that the medium is busy, from times $t_1$ to $t_2$, during the transmission of the CTS-to-self frame.

In some implementations, a duration field (in the MAC header) of the CTS-to-self frame may be used to protect latency-sensitive traffic in the restricted TWT SP. As described with reference to FIG. 8A, STAs that conform to existing versions of the IEEE 802.11 standard must defer medium access for at least the duration indicated by the duration field. In some implementations, to protect the latency-sensitive traffic in the restricted TWT SP, the duration indicated by the duration field may be greater than a duration needed to transmit the trigger frame. As shown in FIG. 8B, the non-legacy STA 816 sets its NAV to the duration indicated by the duration field of the CTS-to-self frame, which spans a duration from times $t_2$ to $t_5$.

In some implementations, low-latency STAs may be configured to ignore any CTS-to-self frames transmitted by an AP at the start of a restricted TWT SP. Thus, the low-latency STA 814 does not set its NAV according to the duration field of the CTS-to-self frame. Instead, the low-latency STA 814 may begin contending for the wireless medium immediately following the transmission of the CTS-to-self frame. As shown in FIG. 8B, the low-latency STA 814 senses that the medium is idle for an AIFS duration, from times $t_2$ to $t_3$, counts down an RBO duration, from times $t_3$ to $t_4$, and acquires a TXOP, from times $t_4$ to $t_6$. During the TXOP, the low-latency STA 814 may transmit latency-sensitive traffic to, or receive latency-sensitive traffic from, an AP or another STA (such as in a peer-to-peer communication).

At the end of the NAV duration, at time $t_5$, the non-legacy STA 816 may contend for medium access. However, the non-legacy STA 816 senses that the medium is busy at time $t_5$ due to the TXOP of the low-latency STA 814. Thus, the non-legacy STA 816 refrains from accessing the shared medium for the duration of the TXOP. After the TXOP of the low-latency STA 814 has terminated, at time $t_6$, the non-legacy STA 816 may once again contend for medium access. As shown in FIG. 8B, the non-legacy STA 816 senses that the medium is idle for an AIFS duration, from times $t_6$ to $t_7$, counts down an RBO duration, from times $t_7$ to $t_8$, and acquires a TXOP, from times $t_5$ to $t_9$.

In some implementations, multiple low-latency STAs (not shown for simplicity) may be members of the restricted TWT SP. In such implementations, the non-legacy STA 816 may defer its medium access even longer (such as described with reference to FIGS. 5-7). For example, because the data traffic associated with a low-latency STA may be assigned to a higher-priority AC than the data traffic associated with a non-member STA, the low-latency STA is more likely to win medium access over the non-member STA during a given contention period.

In some implementations, membership in a restricted TWT SP may be limited so that each low-latency STA associated with the SP has a greater likelihood of gaining a TXOP in a relatively short amount of time. With reference for example to FIG. 8B, if membership in the restricted TWT SP is limited to 2, any additional low-latency STAs in the BSS may be assigned to a different restricted TWT SP.

In some implementations, the NAV duration indicated by the duration field of the CTS-to-self frame may be selected to balance the efficiency of medium utilization with latency gains for latency-sensitive traffic. In the example of FIG. 8B, the NAV duration is configured to terminate before the end of a single TXOP. However, in some other implementations, the NAV duration may be configured to span one or multiple TXOPs.

Figure 9A:
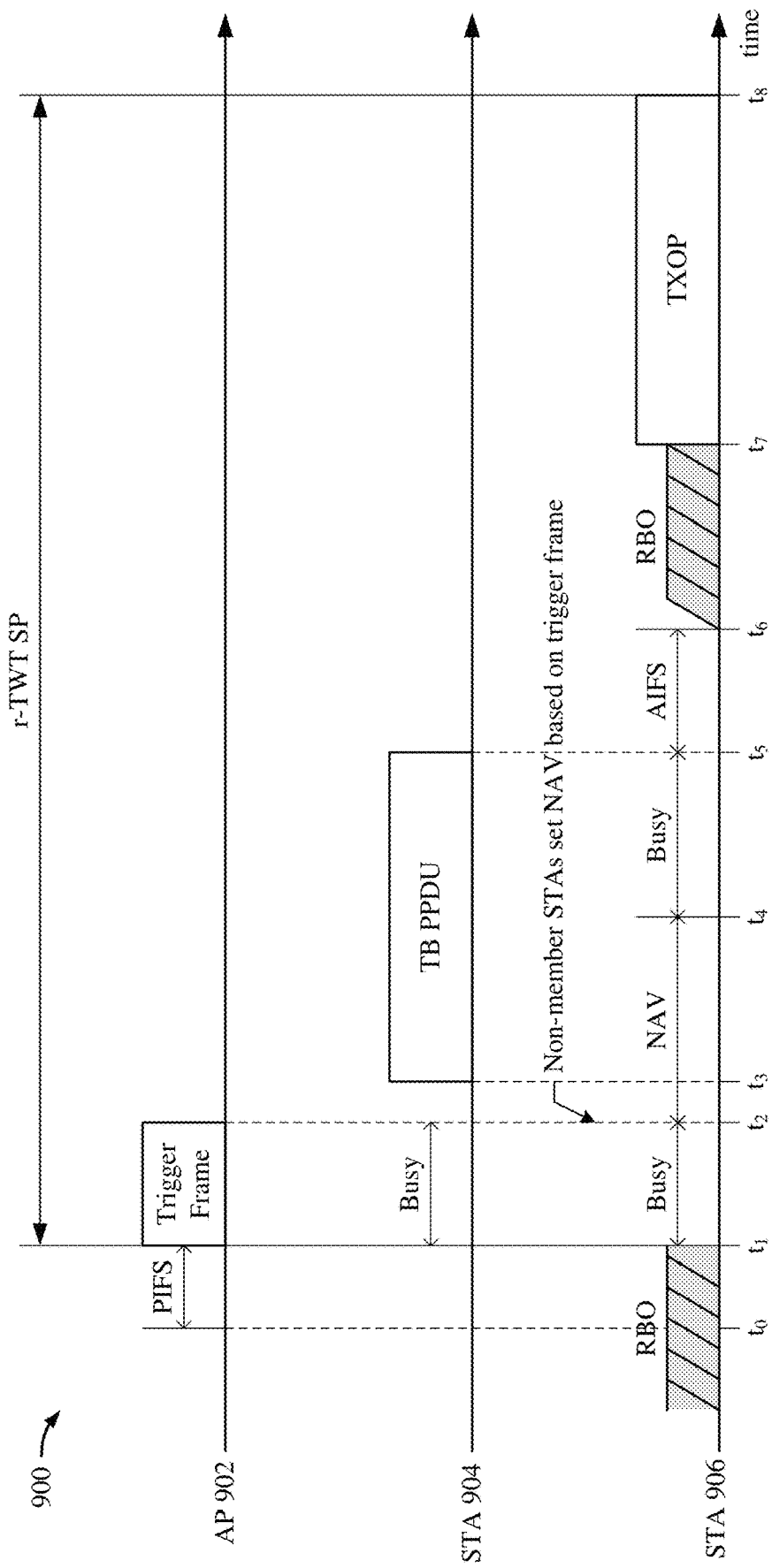
FIG. 9A shows a timing diagram depicting an example of wireless communication among devices belonging to a BSS.

FIG. 9A shows a timing diagram 900 depicting an example of wireless communication among devices belonging to a BSS. In the example of FIG. 9A, the BSS is shown to include an AP 902, a low-latency STA 904, and a non-legacy STA 906. The low-latency STA 904 is a member of a restricted TWT SP (r-TWT SP), which spans a duration from times $t_1$ to $t_5$, whereas the non-legacy STA 906 is not a member of the restricted TWT SP. In some implementations, the AP 902 may be one example of the AP 110 of FIG.

1 or the AP 300 of FIG. 3. In some implementations, each of the STAs 904 and 906 may be one example of any of the STAs 120a-120i of FIG. 1 or the STA 200 of FIG. 2. Although only one low-latency STA and one non-legacy STA is shown in the example of FIG. 9A, in actual implementations, the BSS may include any number of low-latency STAs and any number of non-legacy STAs.

In some implementations, the AP 902 may transmit a trigger frame over a shared wireless medium at the beginning of the restricted TWT SP. More specifically, the AP 902 attempts to time the transmission of the trigger frame to coincide with the start of the restricted TWT SP. In the example of FIG. 9A, the non-legacy STA 906 is counting down its RBO duration before the start of the restricted TWT SP. The AP 902 senses that the medium is idle for a PIFS duration, from times $t_0$ to $t_1$, and proceeds to transmit a trigger frame at time $t_1$. In some implementations, the trigger frame may solicit a trigger-based (TB) physical layer convergence protocol (PLCP) protocol data unit (PPDU) from one or more low-latency STAs (such as the low-latency STA 904). As shown in FIG. 9A, the low-latency STA 904 responds to the trigger frame, at time $t_3$, by transmitting uplink (UL) data to the AP 902 in a TB PPDU.

In some implementations, a duration field (in the MAC header) of the trigger frame may be used to protect latency-sensitive traffic in the restricted TWT SP. As described with reference to FIG. 8A, STAs that conform to existing versions of the IEEE 802.11 standard must defer medium access for at least the duration indicated by the duration field. In some implementations, the duration indicated by the duration field may be greater than a duration needed to transmit the trigger frame. As shown in FIG. 9A, the non-legacy STA 906 sets its NAV to the duration indicated by the duration field of the trigger frame, which spans a duration from times $t_2$ to $t_4$.

At the end of the NAV duration, at time $t_4$, the non-legacy STA 906 may contend for medium access. However, the non-legacy STA 906 senses that the medium is busy at time $t_4$ due to the transmission of the TB PPDU. Thus, the non-legacy STA 906 refrains from accessing the shared medium for the duration of the TB PPDU. After the transmission of the TB PPDU has completed, at time $t_5$, the non-legacy STA 906 may once again contend for medium access. As shown in FIG. 9A, the non-legacy STA 906 senses that the medium is idle for an AIFS duration, from times $t_5$ to $t_6$, counts down an RBO duration, from times $t_6$ to $t_7$, and acquires a TXOP, from times $t_7$ to $t_5$.

In some implementations, the trigger frame may be used to solicit the TB PPDU from multiple low-latency STAs (not shown for simplicity). In such implementations, multiple low-latency STAs may transmit respective UL data to the AP 902, concurrently, in the TB PPDU (from times $t_3$ to $t_5$). In some implementations, the AP 902 may poll the low-latency STAs, prior to the start of the restricted TWT SP, to determine which (if any) of the STAs have UL data to send. For example, the AP 902 may transmit a buffer status report poll (BSRP) trigger frame to the low-latency STAs associated with the restricted TWT SP. Each low-latency STA responds to the BSRP trigger frame by transmitting a buffer status report (BSR) back to the AP 902 indicating the amount of UL data buffered by the STA. The AP 902 may use the information carried in each BSR to determine a resource allocation for the TB PPDU.

In some implementations, the NAV duration carried in the trigger frame may be selected to balance the efficiency of medium utilization with latency gains for latency-sensitive traffic. In the example of FIG. 9A, the NAV duration is configured to terminate before the end of the TB PPDU. However, in some other implementations, the NAV duration may be configured to span beyond the duration of the TB PPDU.

Figure 9B:
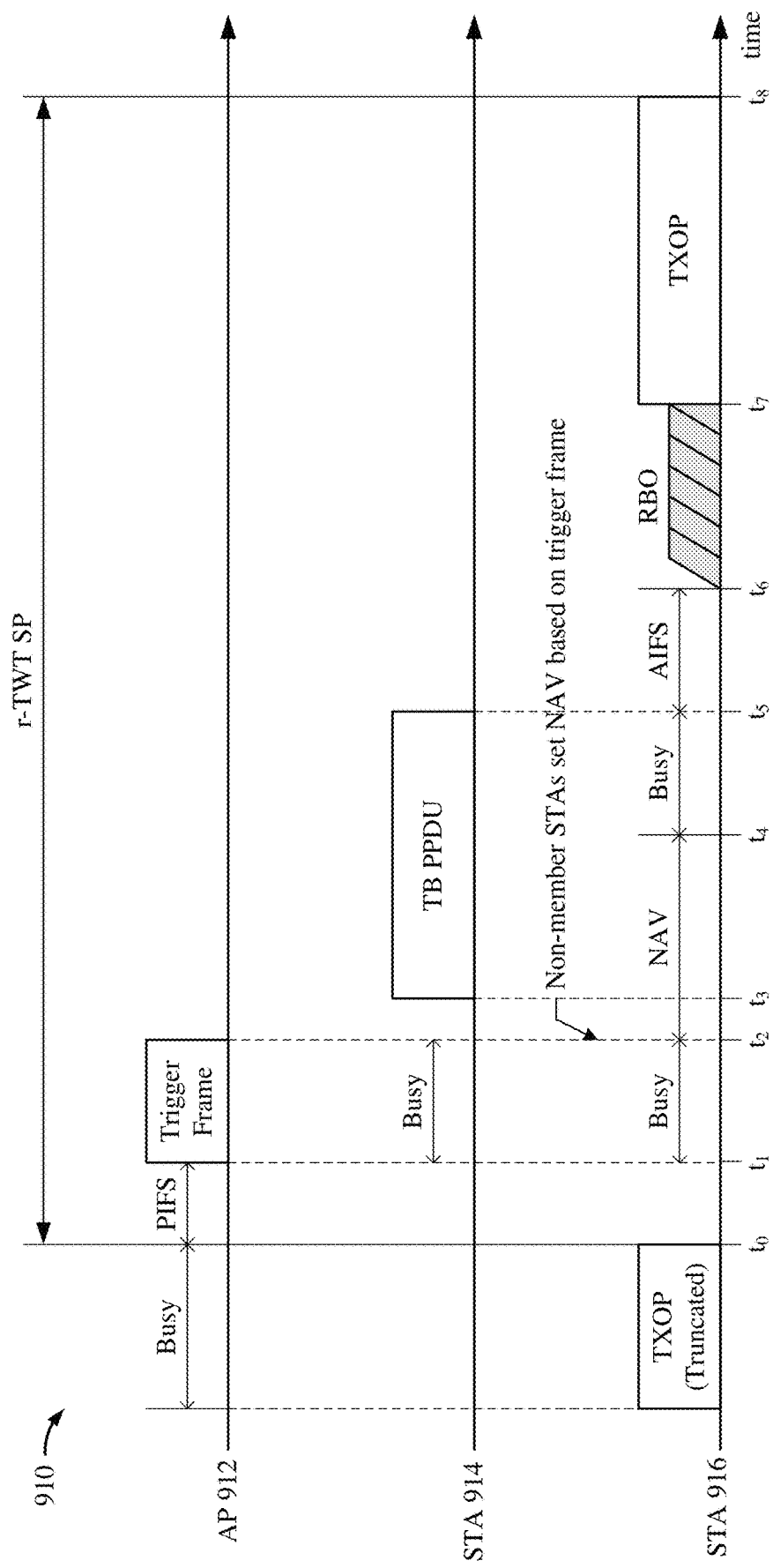
FIG. 9B shows a timing diagram depicting an example of wireless communication among devices belonging to a BSS.

FIG. 9B shows a timing diagram 910 depicting an example of wireless communication among devices belonging to a BSS. In the example of FIG. 9B, the BSS is shown to include an AP 912, a low-latency STA 914, and a non-legacy STA 916. The low-latency STA 914 is a member of a restricted TWT SP (r-TWT SP), which spans a duration from times $t_0$ to $t_8$, whereas the non-legacy STA 916 is not a member of the restricted TWT SP. In some implementations, the AP 912 may be one example of the AP 110 of FIG. 1 or the AP 300 of FIG. 3. In some implementations, each of the STAs 914 and 916 may be one example of any of the STAs 120a-120i of FIG. 1 or the STA 200 of FIG. 2. Although only one low-latency STA and one non-legacy STA is shown in the example of FIG. 9B, in actual implementations, the BSS may include any number of low-latency STAs and any number of non-legacy STAs.

In some implementations, the AP 912 may transmit a trigger frame over a shared wireless medium at the beginning of the restricted TWT SP. More specifically, the AP 912 attempts to time the transmission of the trigger frame to coincide with the start of the restricted TWT SP. In the example of FIG. 9B, the non-legacy STA 916 acquires a truncated TXOP before the start of the restricted TWT SP. The AP 912 senses that the medium is idle for a PIFS duration, from times $t_0$ to $t_1$, and proceeds to transmit a trigger frame at time $t_1$. The trigger frame solicits a TB PPDU from one or more low-latency STAs (such as the low-latency STA 914). As shown in FIG. 9B, the low-latency STA 914 responds to the trigger frame, at time $t_3$, by transmitting UL data to the AP 912 in a TB PPDU.

In some implementations, a duration field (in the MAC header) of the trigger frame may be used to protect latency-sensitive traffic in the restricted TWT SP. As described with reference to FIG. 8A, STAs that conform to existing versions of the IEEE 802.11 standard must defer medium access for at least the duration indicated by the duration field. Thus, to protect the latency-sensitive traffic, the duration indicated by the duration field may be greater than a duration needed to transmit the trigger frame. As shown in FIG. 9B, the non-legacy STA 916 sets its NAV to the duration indicated by the duration field of the trigger frame, which spans a duration from times $t_2$ to $t_4$.

At the end of the NAV duration, at time $t_4$, the non-legacy STA 916 may contend for medium access. However, the non-legacy STA 916 senses that the medium is busy, at time $t_4$ due to the transmission of the TB PPDU. Thus, the non-legacy STA 916 refrains from accessing the shared medium for the duration of the TB PPDU. After the transmission of the TB PPDU completed, at time $t_5$, the non-legacy STA 916 may once again contend for medium access. As shown in FIG. 9B, the non-legacy STA 916 senses that the medium is idle for an AIFS duration, from times $t_5$ to $t_6$, counts down an RBO duration, from times $t_6$ to $t_7$, and acquires a TXOP, from times $t_7$ to $t_5$.

In some implementations, the trigger frame may be used to solicit the TB PPDU from multiple low-latency STAs (not shown for simplicity). In such implementations, multiple low-latency STAs may transmit respective UL data to the AP 912, concurrently, in the TB PPDU (from times $t_3$ to $t_5$). In some implementations, the AP 912 may poll the low-latency STAs, prior to the start of the restricted TWT SP, to determine which (if any) of the STAs have UL data to send. For example, the AP 912 may transmit a BSRP trigger frame to the low-latency STAs associated with the restricted TWT SP. Each low-latency STA responds to the BSRP trigger frame by transmitting a BSR back to the AP 912 indicating the amount of UL data buffered by the STA. The AP 912 may use the information carried in each BSR to determine a resource allocation for the TB PPDU.

In some implementations, the NAV duration carried in the trigger frame may be selected to balance the efficiency of medium utilization with latency gains for latency-sensitive traffic. In the example of FIG. 9B, the NAV duration is configured to terminate before the end of the TB PPDU. However, in some other implementations, the NAV duration may be configured to span beyond the duration of TB PPDU.

Figure 10A:
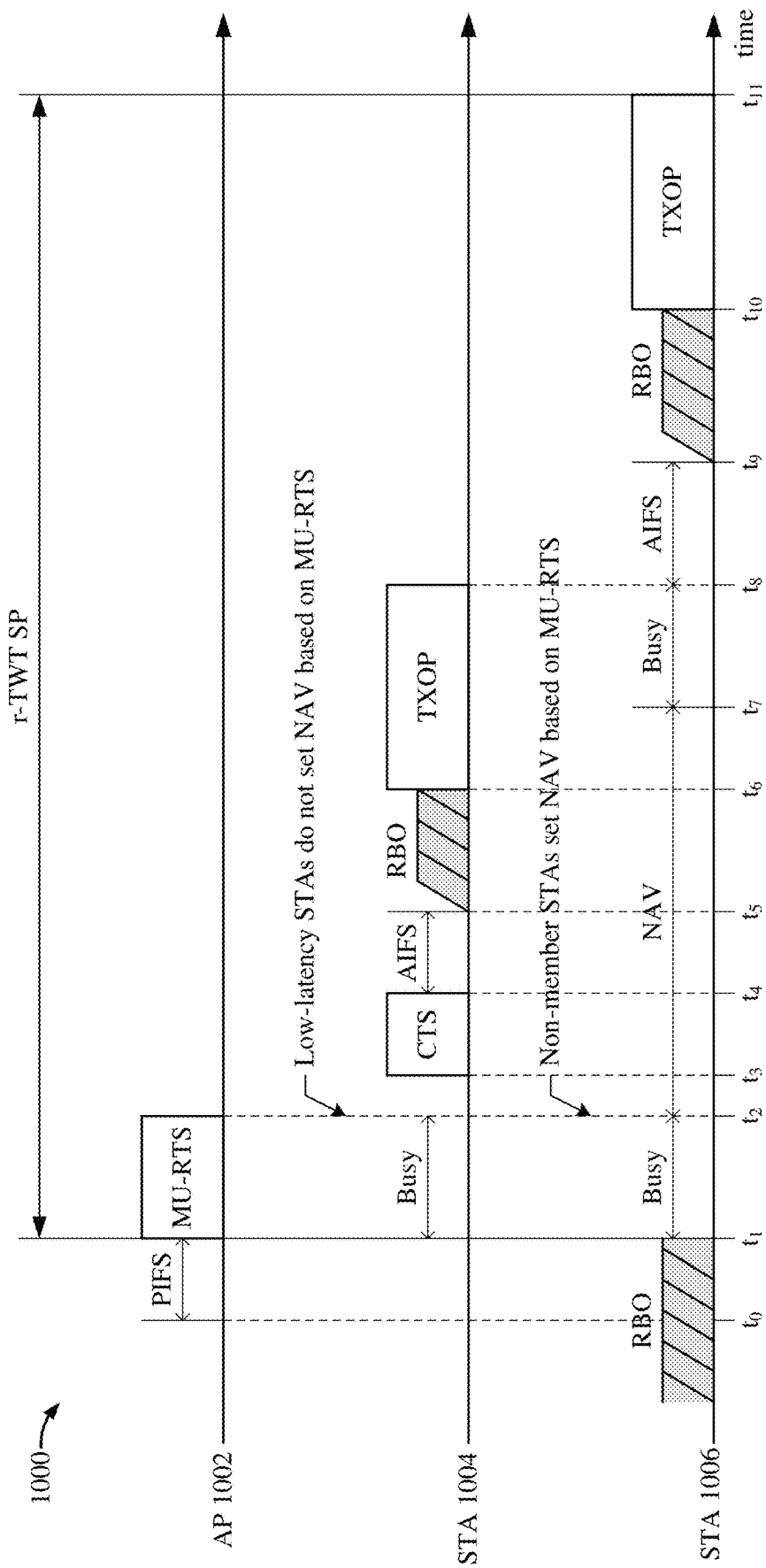
FIG. 10A shows a timing diagram depicting an example of wireless communication among devices belonging to a BSS.

FIG. 10A shows a timing diagram 1000 depicting an example of wireless communication among devices belonging to a BSS. In the example of FIG. 10A, the BSS is shown to include an AP 1002, a low-latency STA 1004, and a non-legacy STA 1006. The low-latency STA 1004 is a member of a restricted TWT SP (r-TWT SP), which spans a duration from times $t_1$ to $t_{11}$, whereas the non-legacy STA 1006 is not a member of the restricted TWT SP. In some implementations, the AP 1002 may be one example of the AP 110 of FIG. 1 or the AP 300 of FIG. 3. In some implementations, each of the STAs 1004 and 1006 may be one example of any of the STAs 120a-120i of FIG. 1 or the STA 200 of FIG. 2. Although only one low-latency STA and one non-legacy STA is shown in the example of FIG. 10A, in actual implementations, the BSS may include any number of low-latency STAs and any number of non-legacy STAs.

In some implementations, the AP 1002 may transmit a multi-user (MU) request-to-send (RTS) frame over a shared wireless medium at the beginning of the restricted TWT SP. More specifically, the AP 1002 attempts to time the transmission of the MU-RTS frame to coincide with the start of the restricted TWT SP. In the example of FIG. 10A, the non-legacy STA 1006 is counting down its RBO duration before the start of the restricted TWT SP. Thus, the AP 1002 senses that the medium is idle for a PIFS duration, from times $t_0$ to $t_1$, and proceeds to transmit the MU-RTS frame at time $t_1$. In some implementations, the MU-RTS frame may identify one or more low-latency STAs (such as the low-latency STA 1004). As shown in FIG. 10A, the low-latency STA 1004 responds to the MU-RTS, at time $t_3$, by transmitting a CTS back to the AP 1002.

In some implementations, a duration field (in the MAC header) of the MU-RTS frame may be used to protect latency-sensitive traffic in the restricted TWT SP. As described with reference to FIG. 8A, STAs that conform to existing versions of the IEEE 802.11 standard must defer medium access for at least the duration indicated by the duration field. In some implementations, the duration indicated by the duration field may be greater than a duration needed to transmit the MU-RTS frame. As shown in FIG. 10A, the non-legacy STA 1006 sets its NAV to the duration indicated by the duration field of the MU-RTS frame, which spans a duration from times $t_2$ to $t_7$. In some other implementations, the non-legacy STA 1006 may set its NAV to the duration indicated by the duration field of the CTS frame.

In some implementations, low-latency STAs may be configured to ignore the duration field of an MU-RTS frames transmitted by an AP at the start of a restricted TWT SP. Thus, the low-latency STA 1004 does not set its NAV according to the duration field of the MU-RTS frame. Instead, the low-latency STA 1004 may begin contending for medium access immediately following the transmission of the CTS. As shown in FIG. 10A, the low-latency STA 1004 senses that the medium is idle for an AIFS duration, from times $t_4$ to $t_5$, counts down an RBO duration, from times $t_5$ to $t_6$, and acquires a TXOP, from times $t_6$ to $t_5$. During the TXOP, the low-latency STA 1004 may transmit latency-sensitive traffic to, or receive latency-sensitive traffic from, an AP or another STA (such as in a peer-to-peer communication).

At the end of the NAV duration, at time $t_7$, the non-legacy STA 1006 may contend for medium access. However, the non-legacy STA 1006 senses that the medium is busy at time $t_7$ due to the TXOP of the low-latency STA 1004. Thus, the non-legacy STA 1006 refrains from accessing the shared medium for the duration of the TXOP. After the TXOP of the low-latency STA 1004 has terminated, at time $t_8$, the non-legacy STA 1006 may once again contend for medium access. As shown in FIG. 10A, the non-legacy STA 1006 senses that the medium is idle for an AIFS duration, from times $t_8$ to $t_9$, counts down an RBO duration, from times $t_9$ to $t_{10}$, and acquires a TXOP, from times $t_{10}$ to $t_{11}$.

In some implementations, the MU-RTS may identify multiple low-latency STAs (not shown for simplicity). In such implementations, each low-latency STA may transmit a respective CTS frame, from times $t_3$ to $t_4$, in response to the MU-RTS frame. As a result, the non-legacy STA 1006 may defer its medium access even longer (such as described with reference to FIGS. 5-7). For example, because the data traffic associated with a low-latency STA may be assigned to a higher-priority AC than the data traffic associated with a non-member STA, the low-latency STA is more likely to win medium access over the non-member STA during a given contention period.

In some implementations, membership in a restricted TWT SP may be limited so that each low-latency STA associated with the SP has a greater likelihood of gaining a TXOP in a relatively short amount of time. With reference for example to FIG. 10A, if membership in the restricted TWT SP is limited to 2, any additional low-latency STAs in the BSS may be assigned to a different restricted TWT SP.

In some implementations, the NAV duration indicated by the duration field of the CTS-to-self frame may be selected to balance the efficiency of medium utilization with latency gains for latency-sensitive traffic. In the example of FIG. 10A, the NAV duration is configured to terminate before the end of a single TXOP. However, in some other implementations, the NAV duration may be configured to span one or multiple TXOPs.

Figure 10B:
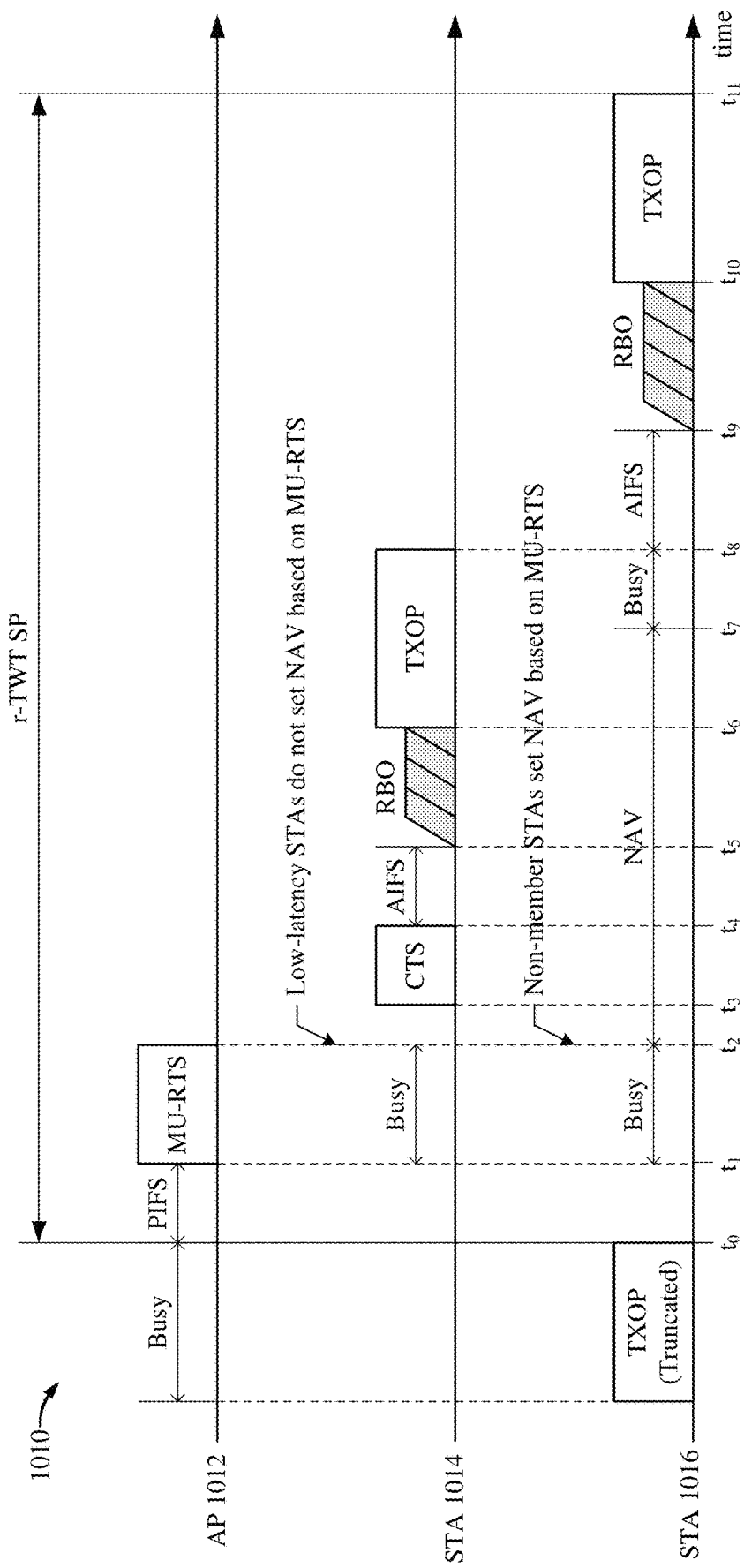
FIG. 10B shows a timing diagram depicting an example of wireless communication among devices belonging to a BSS.

FIG. 10B shows a timing diagram 1010 depicting an example of wireless communication among devices belonging to a BSS. In the example of FIG. 10B, the BSS is shown to include an AP 1012, a low-latency STA 1014, and a non-legacy STA 1016. The low-latency STA 1014 is a member of a restricted TWT SP (r-TWT SP), which spans a duration from times $t_0$ to $t_{11}$, whereas the non-legacy STA 1016 is not a member of the restricted TWT SP. In some implementations, the AP 1012 may be one example of the AP 110 of FIG. 1 or the AP 300 of FIG. 3. In some implementations, each of the STAs 1014 and 1016 may be one example of any of the STAs 120a-120i of FIG. 1 or the STA 200 of FIG. 2. Although only one low-latency STA and one non-legacy STA is shown in the example of FIG. 10B, in actual implementations, the BSS may include any number of low-latency STAs and any number of non-legacy STAs.

In some implementations, the AP 1012 may transmit an MU-RTS frame over a shared wireless medium at the beginning of the restricted TWT SP. More specifically, the AP 1012 attempts to time the transmission of the MU-RTS frame to coincide with the start of the restricted TWT SP. In the example of FIG. 10B, the non-legacy STA 1016 acquires a truncated TXOP before the start of the restricted TWT SP.

The AP 1012 senses that the medium is idle for a PIFS duration, from times $t_0$ to $t_1$, and proceeds to transmit the MU-RTS frame at time $t_1$. In some implementations, the MU-RTS frame may identify one or more low-latency STAs (such as the low-latency STA 1014). As shown in FIG. 10B, the low-latency STA 1014 responds to the MU-RTS, at time $t_3$, by transmitting a CTS back to the AP 1012.

In some implementations, a duration field (in the MAC header) of the MU-RTS frame may be used to protect latency-sensitive traffic in the restricted TWT SP. As described with reference to FIG. 8A, STAs that conform to existing versions of the IEEE 802.11 standard must defer medium access for at least the duration indicated by the duration field. In some implementations, the duration indicated by the duration field may be greater than a duration needed to transmit the MU-RTS frame. As shown in FIG. 10B, the non-legacy STA 1016 sets its NAV to the duration indicated by the duration field of the MU-RTS frame, which spans a duration from times $t_2$ to $t_7$. In some other implementations, the non-legacy STA 1016 may set its NAV to the duration indicated by the duration field of the CTS frame.

In some implementations, low-latency STAs may be configured to ignore the duration field of an MU-RTS frames transmitted by an AP at the start of a restricted TWT SP. Thus, the low-latency STA 1014 does not set its NAV according to the duration field of the MU-RTS frame. Instead, the low-latency STA 1014 may begin contending for medium access immediately following the transmission of the CTS. As shown in FIG. 10B, the low-latency STA 1014 senses that the medium is idle for an AIFS duration, from times $t_4$ to $t_5$, counts down an RBO duration, from times $t_5$ to $t_6$, and acquires a TXOP, from times $t_6$ to $t_5$. During the TXOP, the low-latency STA 1014 may transmit latency-sensitive traffic to, or receive latency-sensitive traffic from, an AP or another STA (such as in a peer-to-peer communication).

At the end of the NAV duration, at time $t_7$, the non-legacy STA 1016 may contend for medium access. However, the non-legacy STA 1016 senses that the medium is busy at time $t_7$ due to the TXOP of the low-latency STA 1014. Thus, the non-legacy STA 1016 refrains from accessing the shared medium for the duration of the TXOP. After the TXOP of the low-latency STA 1014 has terminated, at time $t_8$, the non-legacy STA 1016 may once again contend for medium access. As shown in FIG. 10B, the non-legacy STA 1016 senses that the medium is idle for an AIFS duration, from times $t_8$ to $t_9$, counts down an RBO duration, from times $t_9$ to $t_{10}$, and acquires a TXOP, from times $t_{10}$ to $t_{11}$.

In some implementations, the MU-RTS may identify multiple low-latency STAs (not shown for simplicity). In such implementations, each low-latency STA may transmit a respective CTS frame, from times $t_3$ to $t_4$, in response to the MU-RTS frame. As a result, the non-legacy STA 1016 may defer its medium access even longer (such as described with reference to FIGS. 5-7). For example, because the data traffic associated with a low-latency STA may be assigned to a higher-priority AC than the data traffic associated with a non-member STA, the low-latency STA is more likely to win medium access over the non-member STA during a given contention period.

In some implementations, membership in a restricted TWT SP may be limited so that each low-latency STA associated with the SP has a greater likelihood of gaining a TXOP in a relatively short amount of time. With reference for example to FIG. 10B, if membership in the restricted TWT SP is limited to 2, any additional low-latency STAs in the BSS may be assigned to a different restricted TWT SP.

In some implementations, the NAV duration indicated by the duration field of the CTS-to-self frame may be selected to balance the efficiency of medium utilization with latency gains for latency-sensitive traffic. In the example of FIG. 10B, the NAV duration is configured to terminate before the end of a single TXOP. However, in some other implementations, the NAV duration may be configured to span one or multiple TXOPs.

Figure 11A:
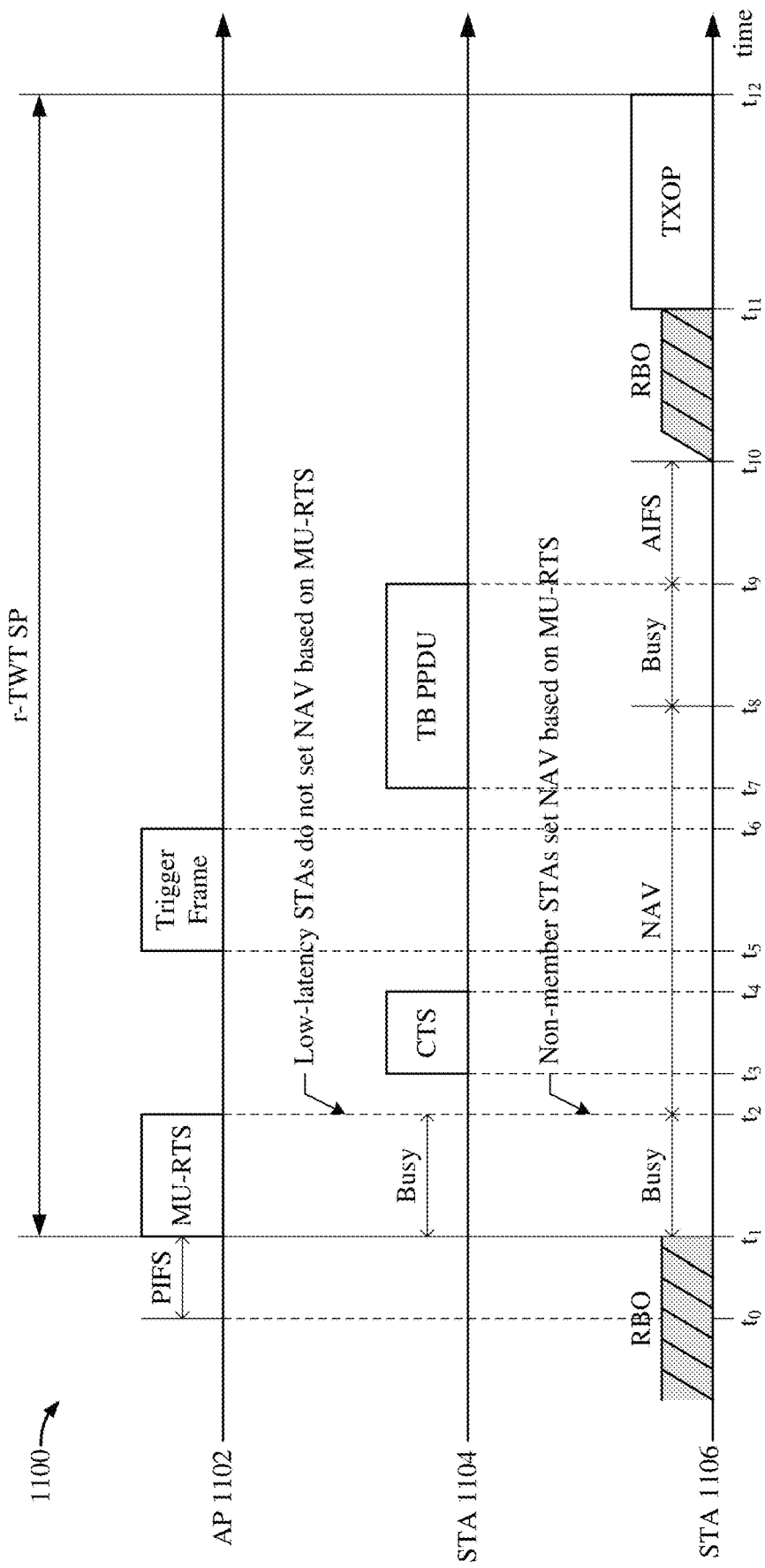
FIG. 11A shows a timing diagram depicting an example of wireless communication among devices belonging to a BSS.

FIG. 11A shows a timing diagram 1100 depicting an example of wireless communication among devices belonging to a BSS. In the example of FIG. 11A, the BSS is shown to include an AP 1102, a low-latency STA 1104, and a non-legacy STA 1106. The low-latency STA 1104 is a member of a restricted TWT SP (r-TWT SP), which spans a duration from times $t_1$ to $t_{12}$, whereas the non-legacy STA 1106 is not a member of the restricted TWT SP. In some implementations, the AP 1102 may be one example of the AP 110 of FIG. 1 or the AP 300 of FIG. 3. In some implementations, each of the STAs 1104 and 1106 may be one example of any of the STAs 120*a*-120*i* of FIG. 1 or the STA 200 of FIG. 2. Although only one low-latency STA and one non-legacy STA is shown in the example of FIG. 11A, in actual implementations, the BSS may include any number of low-latency STAs and any number of non-legacy STAs.

In some implementations, the AP 1102 may transmit an MU-RTS frame over a shared wireless medium at the beginning of the restricted TWT SP. More specifically, the AP 1102 attempts to time the transmission of the MU-RTS frame to coincide with the start of the restricted TWT SP. In the example of FIG. 11A, the non-legacy STA 1106 is counting down its RBO duration before the start of the restricted TWT SP. Thus, the AP 1102 senses that the medium is idle for a PIFS duration, from times $t_0$ to $t_1$, and proceeds to transmit the MU-RTS frame at time $t_1$. In some implementations, the MU-RTS frame may identify one or more low-latency STAs (such as the low-latency STA 1104). As shown in FIG. 11A, the low-latency STA 1104 responds to the MU-RTS, at time $t_3$, by transmitting a CTS back to the AP 1102.

In some implementations, a duration field (in the MAC header) of the MU-RTS frame may be used to protect latency-sensitive traffic in the restricted TWT SP. As described with reference to FIG. 8A, STAs that conform to existing versions of the IEEE 802.11 standard must defer medium access for at least the duration indicated by the duration field. In some implementations, the duration indicated by the duration field may be greater than a duration needed to transmit the MU-RTS frame. As shown in FIG. 11A, the non-legacy STA 1106 sets its NAV to the duration indicated by the duration field of the MU-RTS frame, which spans a duration from times $t_2$ to $t_8$. In some other implementations, the non-legacy STA 1106 may set its NAV to the duration indicated by the duration field of the CTS frame.

In some implementations, the AP 1102 may transmit a trigger frame, at time $t_5$, following the reception of the CTS frame. In some implementations, the trigger frame may solicit a TB PPDU from one or more low-latency STAs (such as the low-latency STA 1104). As shown in FIG. 11A, the low-latency STA 904 responds to the trigger frame, at time $t_7$, by transmitting UL data to the AP 1102 in a TB PPDU.

At the end of the NAV duration, at time $t_5$, the non-legacy STA 1106 may contend for medium access. However, the non-legacy STA 1106 senses that the medium is busy at time $t_5$ due to the transmission of the TB PPDU. Thus, the non-legacy STA 1106 refrains from accessing the shared medium for the duration of the TB PPDU. After the transmission of the TB PPDU has completed, at time $t_9$, the non-legacy STA 1106 may once again contend for medium access. As shown in FIG. 11A, the non-legacy STA 1106 senses that the medium is idle for an AIFS duration, from times $t_9$ to $t_{10}$, counts down an RBO duration, from times $t_{10}$ to $t_{11}$, and acquires a TXOP, from times $t_{11}$ to $t_{12}$.

In some implementations, the MU-RTS may identify multiple low-latency STAs (not shown for simplicity). In such implementations, each low-latency STA may transmit a respective CTS frame, from times $t_3$ to $t_4$, in response to the MU-RTS frame. In some other implementations, the trigger frame may be used to solicit the TB PPDU from multiple low-latency STAs (not shown for simplicity). In such implementations, multiple low-latency STAs may transmit respective UL data to the AP 1102, concurrently, in the TB PPDU (from times $t_7$ to $t_9$).

In some implementations, the AP 1102 may poll the low-latency STAs, prior to the start of the restricted TWT SP, to determine which (if any) of the STAs have UL data to send. For example, the AP 1102 may transmit a BSRP trigger frame to the low-latency STAs associated with the restricted TWT SP. Each low-latency STA responds to the BSRP trigger frame by transmitting a BSR back to the AP 1102 indicating the amount of UL data buffered by the STA. The AP 1102 may use the information carried in each BSR to determine a resource allocation for the TB PPDU.

In some implementations, the NAV duration indicated by the duration field of the MU-RTS frame may be selected to balance the efficiency of medium utilization with latency gains for latency-sensitive traffic. In the example of FIG. 11A, the NAV duration is configured to terminate before the end of the TB PPDU. However, in some other implementations, the NAV duration may be configured to span beyond the duration of the TB PPDU.

Figure 11B:
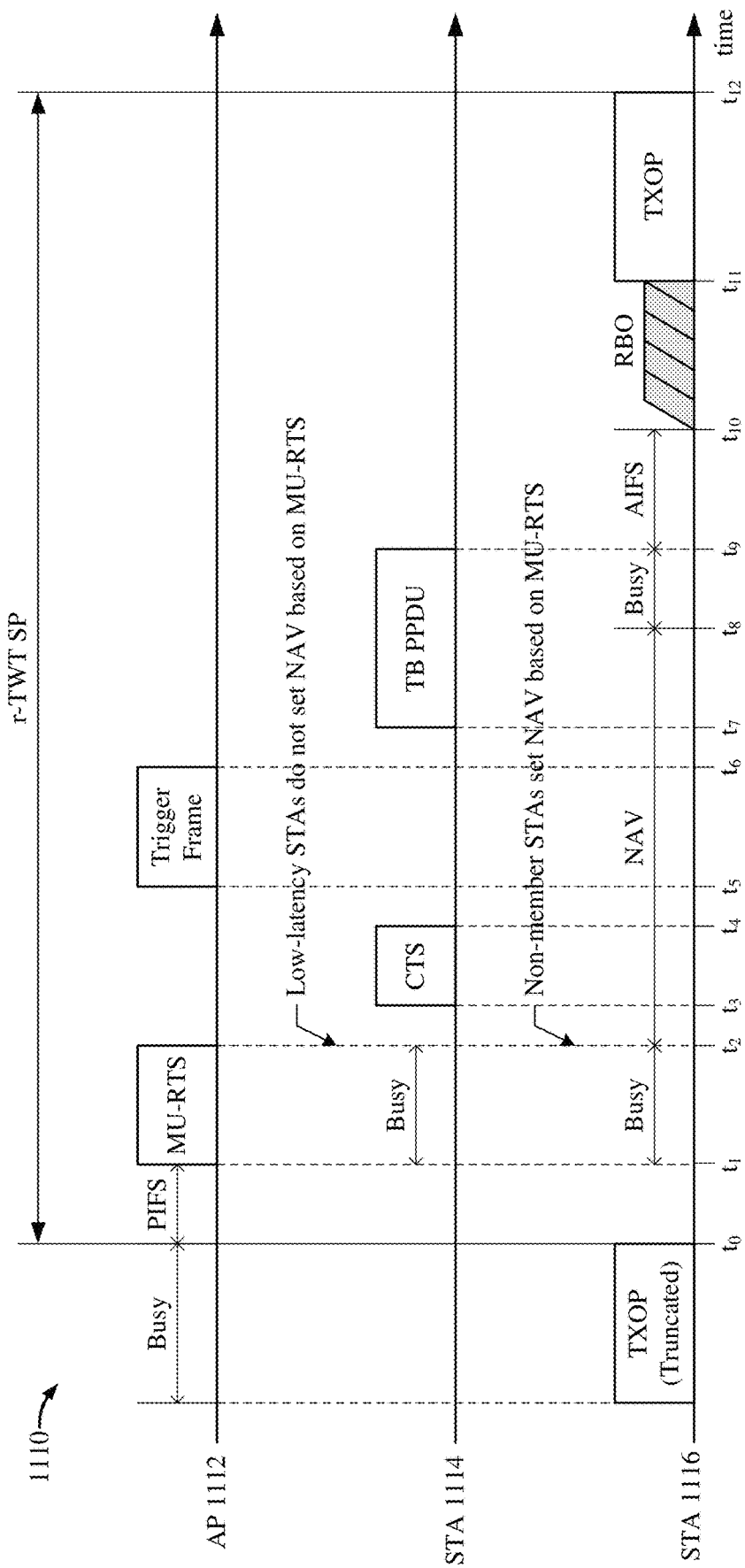
FIG. 11B shows a timing diagram depicting an example of wireless communication among devices belonging to a BSS.

FIG. 11B shows a timing diagram 1110 depicting an example of wireless communication among devices belonging to a BSS. In the example of FIG. 11B, the BSS is shown to include an AP 1112, a low-latency STA 1114, and a non-legacy STA 1116. The low-latency STA 1114 is a member of a restricted TWT SP (r-TWT SP), which spans a duration from times $t_0$ to $t_{12}$, whereas the non-legacy STA 1116 is not a member of the restricted TWT SP. In some implementations, the AP 1112 may be one example of the AP 110 of FIG. 1 or the AP 300 of FIG. 3. In some implementations, each of the STAs 1114 and 1116 may be one example of any of the STAs 120a-120i of FIG. 1 or the STA 200 of FIG. 2. Although only one low-latency STA and one non-legacy STA is shown in the example of FIG. 11B, in actual implementations, the BSS may include any number of low-latency STAs and any number of non-legacy STAs.

In some implementations, the AP 1112 may transmit an MU-RTS frame over a shared wireless medium at the beginning of the restricted TWT SP. More specifically, the AP 1112 attempts to time the transmission of the MU-RTS frame to coincide with the start of the restricted TWT SP. In the example of FIG. 11B, the non-legacy STA 1116 acquires a truncated TXOP before the start of the restricted TWT SP. The AP 1112 senses that the medium is idle for a PIFS duration, from times $t_0$ to $t_1$, and proceeds to transmit the MU-RTS frame at time $t_1$. In some implementations, the MU-RTS frame may identify one or more low-latency STAs (such as the low-latency STA 1114). As shown in FIG. 11B, the low-latency STA 1114 responds to the MU-RTS, at time $t_3$, by transmitting a CTS back to the AP 1112.

In some implementations, a duration field (in the MAC header) of the MU-RTS frame may be used to protect latency-sensitive traffic in the restricted TWT SP. As described with reference to FIG. 8A, STAs that conform to existing versions of the IEEE 802.11 standard must defer medium access for at least the duration indicated by the duration field. In some implementations, the duration indicated by the duration field may be greater than a duration needed to transmit the MU-RTS frame. As shown in FIG. 11B, the non-legacy STA 1116 sets its NAV to the duration indicated by the duration field of the MU-RTS frame, which spans a duration from times $t_2$ to $t_5$. In some other implementations, the non-legacy STA 1116 may set its NAV to the duration indicated by the duration field of the CTS frame.

In some implementations, the AP 1112 may transmit a trigger frame, at time $t_5$, following the reception of the CTS frame. In some implementations, the trigger frame may solicit a TB PPDU from one or more low-latency STAs (such as the low-latency STA 1114). As shown in FIG. 11B, the low-latency STA 904 responds to the trigger frame, at time $t_7$, by transmitting UL data to the AP 1112 in a TB PPDU.

At the end of the NAV duration, at time $t_8$, the non-legacy STA 1116 may contend for medium access. However, the non-legacy STA 1116 senses that the medium is busy at time $t_8$ due to the transmission of the TB PPDU. Thus, the non-legacy STA 1116 refrains from accessing the shared medium for the duration of the TB PPDU. After the transmission of the TB PPDU has completed, at time $t_9$, the non-legacy STA 1116 may once again contend for medium access. As shown in FIG. 11B, the non-legacy STA 1116 senses that the medium is idle for an AIFS duration, from times $t_9$ to $t_{10}$, counts down an RBO duration, from times $t_{10}$ to $t_{11}$, and acquires a TXOP, from times $t_{11}$ to $t_{12}$.

In some implementations, the MU-RTS may identify multiple low-latency STAs (not shown for simplicity). In such implementations, each low-latency STA may transmit a respective CTS frame, from times $t_3$ to $t_4$, in response to the MU-RTS frame. In some other implementations, the trigger frame may be used to solicit the TB PPDU from multiple low-latency STAs (not shown for simplicity). In such implementations, multiple low-latency STAs may transmit respective UL data to the AP 1112, concurrently, in the TB PPDU (from times $t_7$ to $t_9$).

In some implementations, the AP 1112 may poll the low-latency STAs, prior to the start of the restricted TWT SP, to determine which (if any) of the STAs have UL data to send. For example, the AP 1112 may transmit a BSRP trigger frame to the low-latency STAs associated with the restricted TWT SP. Each low-latency STA responds to the BSRP trigger frame by transmitting a BSR back to the AP 1112 indicating the amount of UL data buffered by the STA. The AP 1112 may use the information carried in each BSR to determine a resource allocation for the TB PPDU.

In some implementations, the NAV duration indicated by the duration field of the MU-RTS frame may be selected to balance the efficiency of medium utilization with latency gains for latency-sensitive traffic. In the example of FIG. 11B, the NAV duration is configured to terminate before the end of the TB PPDU. However, in some other implementations, the NAV duration may be configured to span beyond the duration of the TB PPDU.

Figure 12:
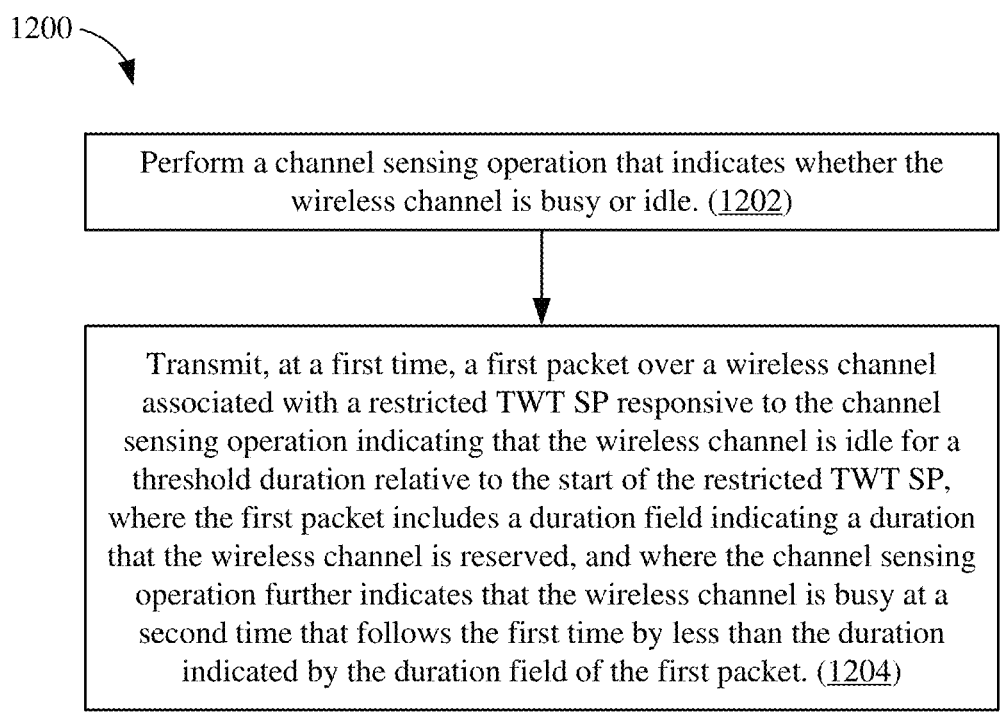
FIG. 12 shows an illustrative flowchart depicting an example wireless communication operation.

FIG. 12 shows an illustrative flowchart 1200 depicting an example wireless communication operation. The example operation 1200 may be performed by a wireless communication device such as any of the APs 110 or 300 of FIGS. 1 and 3, respectively.

The wireless communication device performs a channel sensing operation that indicates whether the wireless channel is busy or idle (1202). The wireless communication device further transmits, at a first time, a first packet over a wireless channel associated with a restricted TWT SP responsive to the channel sensing operation indicating that the wireless channel is idle for a threshold duration relative to the start of the restricted TWT SP, where the first packet includes a duration field indicating a duration that the wireless channel is reserved, and where the channel sensing operation further indicates that the wireless channel is busy at a second time that follows the first time by less than the duration indicated by the duration field of the first packet (1204).

In some implementations, the wireless communication device may further receive, at a third time, a third packet over the wireless channel from a second STA, where the third time occurs after the second time and before the end of the restricted TWT SP. In some implementations, the first time may coincide with the start of the restricted TWT SP. In some implementations, the duration indicated by the duration field of the first packet may be greater than a duration required to complete the transmission of the first packet. In some implementations, the threshold duration may be a PIFS duration. In some implementations, a duration between the first time and the start of the restricted TWT SP may be less than or equal to the threshold duration. In some implementations, the first packet may be a clear-to-send CTS-to-self frame.

In some implementations, the wireless communication device may further receive, at the second time, a second packet over the wireless channel from a first STA associated with the restricted TWT SP. In some implementations, the first packet may be an MU-RTS frame and the second packet may be a CTS frame. In some other implementations, the first packet may be a trigger frame soliciting first uplink data from the first STA and the second packet may be a TB PPDU that carries the first uplink data. In some implementations, the trigger frame may further solicit second uplink data from a second STA associated with the restricted TWT SP and the TB PPDU may further carry the second uplink data. In some implementations, the wireless communication device may further transmit a BSRP trigger frame to the first STA before the start of the restricted TWT SP and may receive a BSR from the first STA responsive to the BSRP trigger frame, where the BSR indicates an availability of the first uplink data.

Figure 13:
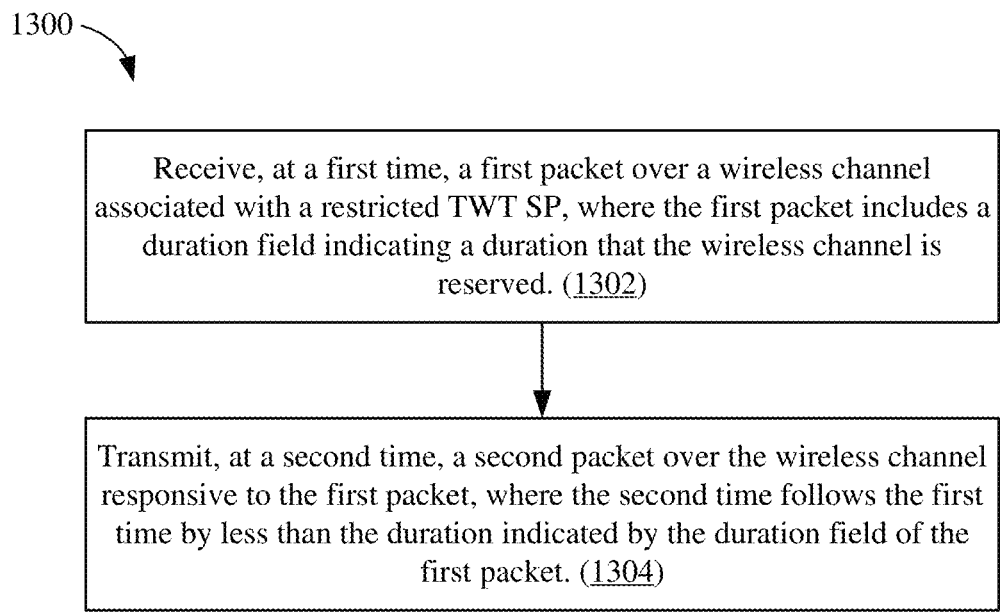
FIG. 13 shows an illustrative flowchart depicting an example wireless communication operation.

FIG. 13 shows an illustrative flowchart 1300 depicting an example wireless communication operation. The example operation 1300 may be performed by a wireless communication device such as any of the STAs 120*a*-120*i* of FIG. 1 or the STA 200 of FIG. 2.

The wireless communication device receives, at a first time, a first packet over a wireless channel associated with a restricted TWT SP, where the first packet includes a duration field indicating a duration that the wireless channel is reserved (1302). In some implementations, the first time may coincide with the start of the restricted TWT SP. In some implementations, the duration indicated by the duration field of the first packet may be greater than a duration required to complete the transmission of the first packet. In some implementations, a duration between the first time and the start of the restricted TWT SP may be less than or equal to a PIFS duration. In some implementations, the first packet may be a CTS-to-self frame.

The wireless communication device further transmits, at a second time, a second packet over the wireless channel responsive to the first packet, where the second time follows the first time by less than the duration indicated by the duration field of the first packet (1304). In some implementations, the second packet may be transmitted to an AP. In some other implementations, the second packet may be transmitted to a STA. In some implementations, the first packet may be an MU-RTS frame and the second packet may be a CTS frame. In some other implementations, the first packet may be a trigger frame soliciting uplink data from the wireless communication device and the second packet may be a TB PPDU that carries the uplink data. In some implementations, the wireless communication device may further receive a BSRP trigger frame before the start of the restricted TWT SP and may transmit a BSR responsive to the BSRP trigger frame, where the BSR indicates an availability of the uplink data.

Figure 14:
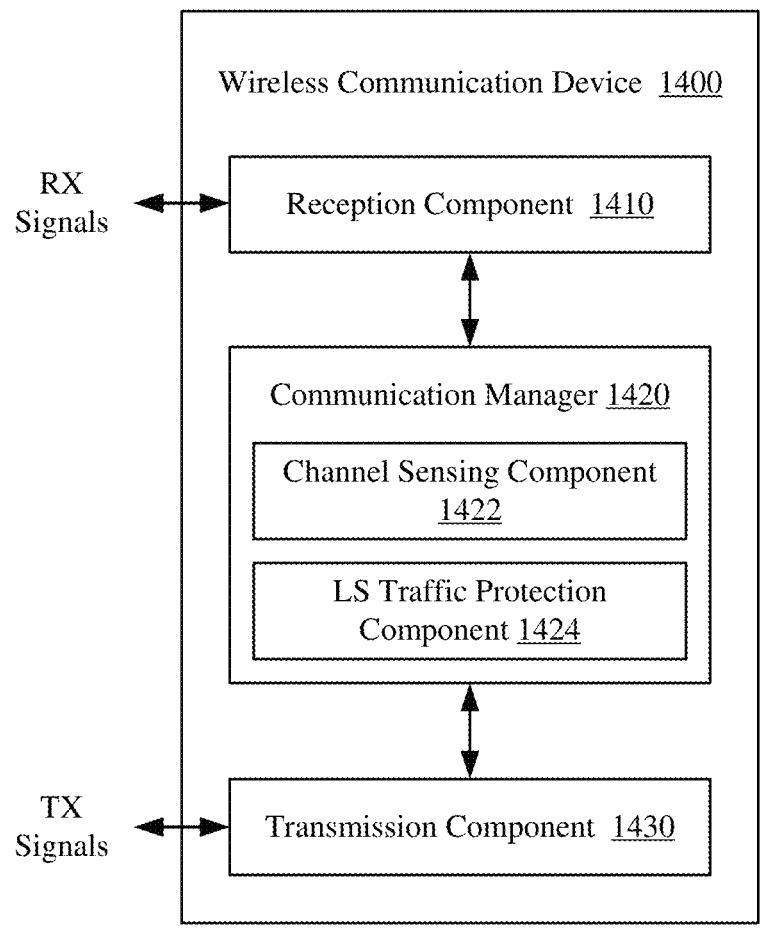
FIG. 14 shows a block diagram of an example wireless communication device.

FIG. 14 shows a block diagram of an example wireless communication device 1400. In some implementations, the wireless communication device 1400 may be configured to perform the process 1200 described above with reference to FIG. 12. The wireless communication device 1400 can be an example implementation of any of the APs 110 or 300 of FIGS. 1 and 3, respectively. More specifically, the wireless communication device 1400 can be a chip, SoC, chipset, package or device that includes at least one processor and at least one modem (for example, a Wi-Fi (IEEE 802.11) modem or a cellular modem).

The wireless communication device 1400 includes a reception component 1410, a communication manager 1420, and a transmission component 1430. The communication manager 1420 further includes a channel sensing component 1422 and a latency-sensitive (LS) traffic protection component 1424. Portions of one or more of the components 1422 or 1424 may be implemented at least in part in hardware or firmware. In some implementations, one or more of the components 1422 or 1424 are implemented at least in part as software stored in a memory (such as the memory 240 of FIG. 2 or the memory 330 of FIG. 3). For example, portions of one or more of the components 1422 or 1424 can be implemented as non-transitory instructions (or "code") executable by a processor (such as the processor 320 of FIG. 3) to perform the functions or operations of the respective component.

The reception component 1410 is configured to receive RX signals from one or more other wireless communication devices and the transmission component 1430 is configured to transmit TX signals to one or more other wireless communication devices. The communication manager 1420 is configured to manage wireless communications with one or more other wireless communication devices. In some implementations, the channel sensing component 1422 may perform a channel sensing operation that indicates whether the wireless channel is busy or idle; and the LS traffic protection component 1424 may transmit, at a first time, a first packet over a wireless channel associated with a restricted TWT SP responsive to the channel sensing operation indicating that the wireless channel is idle for a threshold duration relative to the start of the restricted TWT SP, where the first packet includes a duration field indicating a duration that the wireless channel is reserved, and where the channel sensing operation further indicates that the wireless channel is busy at a second time that follows the first time by less than the duration indicated by the duration field of the first packet.

Figure 15:
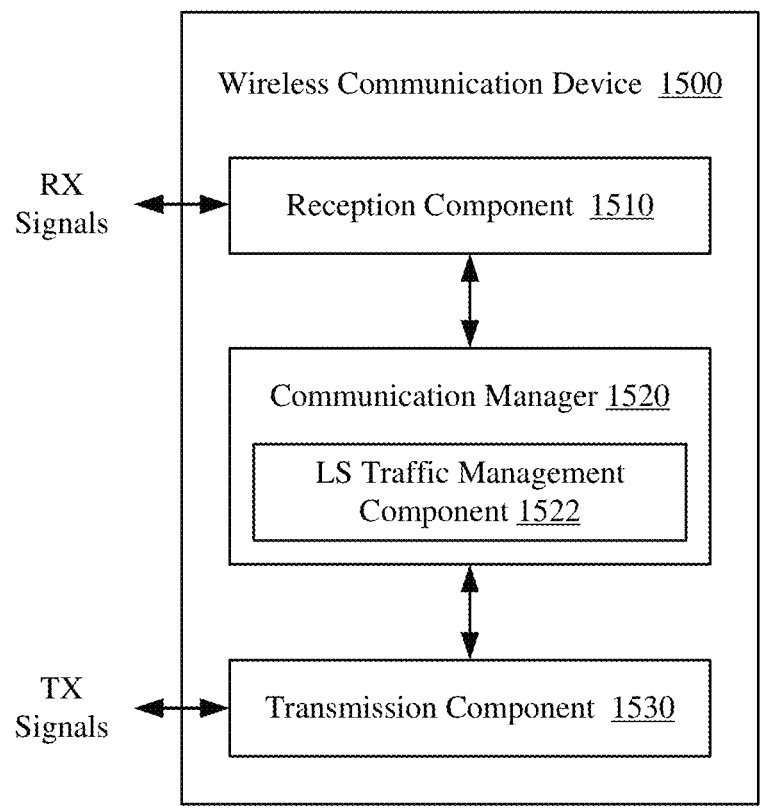
FIG. 15 shows a block diagram of an example wireless communication device.

FIG. 15 shows a block diagram of an example wireless communication device 1500. In some implementations, the wireless communication device 1500 may be configured to perform the process 1300 described above with reference to FIG. 13. The wireless communication device 1500 can be an example implementation of any of the STAs 120*a*-120*i* of FIG. 1 or the STA 200 of FIG. 2. More specifically, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 further includes a latency-sensitive (LS) traffic management component 1522. Portions of the LS traffic management component 1522 may be implemented at least in part in hardware or firmware. In some implementations, the LS traffic management component 1522 is implemented at least in part as software stored in a memory (such as the memory 240 of FIG. 2 or the memory 330 of FIG. 3). For example, portions of the LS traffic management component 1522 can be implemented as non-transitory instructions (or "code") executable by a processor (such as the processor 220 of FIG. 2) to perform the functions or operations of the respective component.

The reception component 1510 is configured to receive RX signals from one or more other wireless communication devices and the transmission component 1530 is configured to transmit TX signals to one or more other wireless communication devices. In some implementations, the reception component 1510 may receive, at a first time, a first packet over a wireless channel associated with a restricted TWT SP, where the first packet includes a duration field indicating a duration that the wireless channel is reserved. In some implementations, the transmission component 1530 may transmit, at a second time, a second packet over the wireless channel responsive to the first packet, where the second time follows the first time by less than the duration indicated by the duration field of the first packet.

Implementation examples are described in the following numbered clauses:

1. A method for wireless communication by a wireless communication device, including:
   performing a channel sensing operation that indicates whether the wireless channel is busy or idle; and
   transmitting, at a first time, a first packet over a wireless channel associated with a restricted target wake time (TWT) service period (SP) responsive to the channel sensing operation indicating that the wireless channel is idle for a threshold duration relative to the start of the restricted TWT SP, the first packet including a duration field indicating a duration that the wireless channel is reserved, the channel sensing operation further indicating that the wireless channel is busy at a second time that follows the first time by less than the duration indicated by the duration field of the first packet.
2. The method of clause 1, where the first time coincides with the start of the restricted TWT SP.
3. The method of any of clauses 1 or 2, where the duration indicated by the duration field of the first packet is greater than a duration required to complete the transmission of the first packet.
4. The method of any of clauses 1-3, where the threshold duration is a point coordination function (PCF) interframe space (PIFS) duration.
5. The method of any of clauses 1-4, where a duration between the first time and the start of the restricted TWT SP is less than or equal to the threshold duration.
6. The method of any of clauses 1-5, further including:
   receiving, at the second time, a second packet over the wireless channel from a first wireless station (STA) associated with the restricted TWT SP.
7. The method of any of clauses 1-6, where the first packet includes a clear-to-send (CTS)-to-self frame.
8. The method of any of clauses 1-6, where the first packet includes a multi-user (MU) request-to-send (RTS) frame and the second packet includes a CTS frame.
9. The method of any of clauses 1-6, where the first packet includes a trigger frame soliciting first uplink data from the first STA and the second packet is a trigger-based (TB) physical layer convergence protocol (PLCP) protocol data unit (PPDU) that carries the first uplink data.
10. The method of any of clauses 1-6 or 9, where the trigger frame further solicits second uplink data from a second STA associated with the restricted TWT SP and the TB PPDU further carries the second uplink data.
11. The method of any of clauses 1-6, 9, or 10, further including:
    transmitting a buffer status report poll (BSRP) trigger frame to the first STA before the start of the restricted TWT SP; and
    receiving a buffer status report (BSR) from the first STA responsive to the BSRP trigger frame, the BSR indicating an availability of the first uplink data.
12. The method of any of clauses 1-11, further including:
    receiving, at a third time, a third packet over the wireless channel from a second STA, the third time occurring after the second time and before the end of the restricted TWT SP.
13. A wireless communication device, including:
    a processing system configured to perform a channel sensing operation that indicates whether the wireless channel is busy or idle; and
    at least one interface configured to transmit, at a first time, a first packet over a wireless channel associated with a restricted target wake time (TWT) service period (SP) responsive to the channel sensing operation indicating that the wireless channel is idle for a threshold duration relative to the start of the restricted TWT SP, the first packet including a duration field indicating a duration that the wireless channel is reserved, the channel sensing operation further indicating that the wireless channel is busy at a second time that follows the first time by less than the duration indicated by the duration field of the first packet.
14. The wireless communication device of clause 13, where the first packet includes a clear-to-send (CTS)-to-self frame.
15. The wireless communication device of clause 13, where the at least one interface is further configured to receive, at the second time, a second packet over the wireless channel from a wireless station (STA) associated with the restricted TWT SP, the first packet including a multi-user (MU) request-to-send (RTS) frame and the second packet including a CTS frame.
16. The wireless communication device of clause 13, where the at least one interface is further configured to receive, at the second time, a second packet over the wireless channel from a STA associated with the restricted TWT SP, the first packet including a trigger frame soliciting uplink data from the STA, the second packet being a trigger-based (TB) physical layer convergence protocol (PLCP) protocol data unit (PPDU) that carries the uplink data.
17. A method performed by a wireless communication device, including:
    receiving, at a first time, a first packet over a wireless channel associated with a restricted target wake time (TWT) service period (SP), the first packet including a duration field indicating a duration that the wireless channel is reserved; and transmitting, at a second time, a second packet over the wireless channel responsive to the first packet, the second time following the first time by less than the duration indicated by the duration field of the first packet.

18. The method of clause 17, where the first time coincides with the start of the restricted TWT SP.

19. The method of any of clauses 17 or 18, where the duration indicated by the duration field of the first packet is greater than a duration required to complete the transmission of the first packet.

20. The method of any of clauses 17-19, where a duration between the first time and the start of the restricted TWT SP is less than or equal to a point coordination function (PCF) interframe space (PIFS) duration.

21. The method of any of clauses 17-20, where the first packet includes a clear-to-send (CTS)-to-self frame.

22. The method of any of clauses 17-20, where the first packet includes a multi-user (MU) request-to-send (RTS) frame and the second packet includes a CTS frame.

23. The method of any of clauses 17-20, where the first packet includes a trigger frame soliciting uplink data from the wireless communication device and the second packet is a trigger-based (TB) physical layer convergence protocol (PLCP) protocol data unit (PPDU) that carries the uplink data.

24. The method of claim any of clauses 17-20 or 23, further including:

receiving a buffer status report poll (BSRP) trigger frame before the start of the restricted TWT SP; and transmitting a buffer status report (BSR) responsive to the BSRP trigger frame, the BSR indicating an availability of the uplink data.

25. The method of any of clauses 17-24, where the second packet is transmitted to an access point (AP).

26. The method of any of clauses 17-24, where the second packet is transmitted to a wireless station (STA).

27. A wireless communication device, including:

a processing system; and an interface configured to:

receive, at a first time, a first packet over a wireless channel associated with a restricted target wake time (TWT) service period (SP), the first packet including a duration field indicating a duration that the wireless channel is reserved; and transmit, at a second time, a second packet over the wireless channel responsive to the first packet, the second time following the first time by less than the duration indicated by the duration field of the first packet.

28. The wireless communication device of clause 27, where the first packet includes a clear-to-send (CTS)-to-self frame.

29. The wireless communication device of clause 27, where the first packet includes a multi-user (MU) request-to-send (RTS) frame and the second packet includes a CTS frame.

30. The wireless communication device of clause 27, where the first packet includes a trigger frame soliciting uplink data from the wireless communication device and the second packet is a trigger-based (TB) physical layer convergence protocol (PLCP) protocol data unit (PPDU) that carries the uplink data.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method performed by a wireless communication device, comprising:

performing a channel sensing operation that indicates whether a wireless channel is busy or idle; and transmitting, at a first time, a first packet over a wireless channel associated with a restricted target wake time (TWT) service period (SP) responsive to the channel sensing operation indicating that the wireless channel is idle for a threshold duration relative to a start of the restricted TWT SP, the first packet including a duration field indicating a duration that the wireless channel is reserved, wherein the duration corresponds to a first portion of the restricted TWT SP, wherein a second portion of the restricted TWT SP following the first portion is available for contention by any of one or more first devices that are members of the restricted TWT SP and one or more second devices that are non-members of the restricted TWT SP.

2. The method of claim 1, wherein the first time coincides with the start of the restricted TWT SP.

3. The method of claim 1, wherein the duration indicated by the duration field of the first packet is greater than a third duration required to complete the transmission of the first packet.

4. The method of claim 1, wherein the threshold duration is a point coordination function (PCF) interframe space (PIFS) duration.

5. The method of claim 1, wherein a third duration between the first time and the start of the restricted TWT SP is less than or equal to the threshold duration.

6. The method of claim 1, wherein the first packet comprises a clear-to-send (CTS)-to-self frame.

7. The method of claim 1, further comprising:
receiving, at the second time, a second packet over the wireless channel from a first wireless station (STA) associated with the restricted TWT SP.

8. The method of claim 7, wherein the first packet comprises a multi-user (MU) request-to-send (RTS) frame and the second packet comprises a CTS frame.

9. The method of claim 7, wherein the first packet comprises a trigger frame soliciting first uplink data from the first STA and the second packet is a trigger-based (TB) physical layer convergence protocol (PLCP) protocol data unit (PPDU) that carries the first uplink data.

10. The method of claim 1, further comprising:
receiving, at a third time, a third packet over the wireless channel from a second STA, the third time occurring after the second time and before an end of the restricted TWT SP.

11. The method of claim 1, further comprising:
transmitting a quiet element indicating a quiet time duration relative to the start of the restricted TWT SP, the quiet element indicating that, during the quiet time duration, the one or more second devices that are non-members of the restricted TWT SP are restricted from contending for access to the wireless channel.

12. A wireless communication device, comprising:
a processing system comprising one or more processors, the processing system configured to perform a channel sensing operation that indicates whether a wireless channel is busy or idle; and
at least one interface configured to transmit, at a first time, a first packet over a wireless channel associated with a restricted target wake time (TWT) service period (SP) responsive to the channel sensing operation indicating that the wireless channel is idle for a threshold duration relative to a start of the restricted TWT SP, the first packet including a duration field indicating a duration that the wireless channel is reserved, wherein the duration corresponds to a first portion of the restricted TWT SP, wherein a second portion of the restricted TWT SP following the first portion is available for contention by any of one or more first devices that are members of the restricted TWT SP and one or more second devices that are non-members of the restricted TWT SP.

13. The wireless communication device of claim 12, wherein the first packet comprises a clear-to-send (CTS)-to-self frame.

14. The wireless communication device of claim 12, wherein the at least one interface is further configured to receive, at the second time, a second packet over the wireless channel from a wireless station (STA) associated with the restricted TWT SP, the first packet comprising a multi-user (MU) request-to-send (RTS) frame and the second packet comprising a CTS frame.

15. The wireless communication device of claim 12, wherein the at least one interface is further configured to receive, at the second time, a second packet over the wireless channel from a STA associated with the restricted TWT SP, the first packet comprising a trigger frame soliciting uplink data from the STA, the second packet being a trigger-based (TB) physical layer convergence protocol (PLCP) protocol data unit (PPDU) that carries the uplink data.

16. A method performed by a wireless communication device, comprising:
receiving, at a first time, a first packet over a wireless channel associated with a restricted target wake time (TWT) service period (SP), the first packet including a duration field indicating a duration that the wireless channel is reserved, wherein the duration corresponds to a first portion of the restricted TWT SP, wherein a second portion of the restricted TWT SP following the first portion is available for contention by any of one or more first devices that are members of the restricted TWT SP and one or more second devices that are non-members of the restricted TWT SP; and
transmitting, at a second time, a second packet over the wireless channel responsive to the first packet, the second time occurring during the first portion of the restricted TWT SP based at least in part on the wireless communication device being a member of the restricted TWT SP.

17. The method of claim 16, wherein the first time coincides with a start of the restricted TWT SP.

18. The method of claim 16, wherein the duration indicated by the duration field of the first packet is greater than a third duration required to complete the transmission of the first packet.

19. The method of claim 16, wherein a third duration between the first time and a start of the restricted TWT SP is less than or equal to a point coordination function (PCF) interframe space (PIFS) duration.

20. The method of claim 16, wherein the first packet comprises a clear-to-send (CTS)-to-self frame.

21. The method of claim 16, wherein the first packet comprises a multi-user (MU) request-to-send (RTS) frame and the second packet comprises a CTS frame.

22. The method of claim 16, wherein the first packet comprises a trigger frame soliciting uplink data from the wireless communication device and the second packet is a trigger-based (TB) physical layer convergence protocol (PLCP) protocol data unit (PPDU) that carries the uplink data.

23. The method of claim 22, further comprising:
receiving a buffer status report poll (BSRP) trigger frame before a start of the restricted TWT SP; and transmitting a buffer status report (BSR) responsive to the BSRP trigger frame, the BSR indicating an availability of the uplink data.

24. The method of claim 16, wherein the second packet is transmitted to an access point (AP).

25. The method of claim 16, wherein the second packet is transmitted to a wireless station (STA).

26. The method of claim 16, further comprising:
receiving a quiet element indicating a quiet time duration relative to the start of the restricted TWT SP, the quiet element indicating that, during the quiet time duration, the one or more second devices that are non-members of the restricted TWT SP are restricted from contending for access to the wireless channel.

27. A wireless communication device, comprising:
a processing system comprising one or more processors; and
an interface configured to:
receive, at a first time, a first packet over a wireless channel associated with a restricted target wake time (TWT) service period (SP), the first packet including a duration field indicating a duration that the wireless channel is reserved, wherein the duration corresponds to a first portion of the restricted TWT SP, and wherein a second portion of the restricted TWT SP following the first portion is available for contention by any of one or more first devices that are members of the restricted TWT SP and one or more second devices that are non-members of the restricted TWT SP; and
transmit, at a second time, a second packet over the wireless channel responsive to the first packet, the second time occurring during the first portion of the restricted TWT SP based at least in part on the wireless communication device being a member of the restricted TWT SP.

28. The wireless communication device of claim 27, wherein the first packet comprises a clear-to-send (CTS)-to-self frame.

29. The wireless communication device of claim 27, wherein the first packet comprises a multi-user (MU) request-to-send (RTS) frame and the second packet comprises a CTS frame.

30. The wireless communication device of claim 27, wherein the first packet comprises a trigger frame soliciting uplink data from the wireless communication device and the second packet is a trigger-based (TB) physical layer convergence protocol (PLCP) protocol data unit (PPDU) that carries the uplink data.

* * * * *